(12) United States Patent
Kameyama

(10) Patent No.: US 6,198,484 B1
(45) Date of Patent: *Mar. 6, 2001

(54) STEREOSCOPIC DISPLAY SYSTEM

(75) Inventor: Kenichi Kameyama, Kawasaki (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,664

(22) Filed: Jun. 27, 1997

(30) Foreign Application Priority Data

Jun. 27, 1996 (JP) .................................. 8-167999

(51) Int. Cl.[7] ............................ G06T 15/00; H04N 13/00
(52) U.S. Cl. ............................................. 345/419; 348/42
(58) Field of Search .................................. 345/419, 139, 345/427; 348/42, 51

(56) References Cited

U.S. PATENT DOCUMENTS

| 4,870,600 | * | 9/1989 | Hiraoka ................................. 345/419 |
| 5,119,189 | * | 6/1992 | Iwamoto et al. ....................... 348/47 |
| 5,801,760 | * | 9/1998 | Uomori ................................. 348/47 |

FOREIGN PATENT DOCUMENTS

| 0 389 090 | 9/1990 | (EP) . |
| 0 425 985 | 5/1991 | (EP) . |
| 7-167633 | 7/1995 | (JP) . |

OTHER PUBLICATIONS

A. Geiser, et al., Displays, vol. 14, No. 3, pp. 144–149, "A Tool For Viewpoint–Dependent Graphical Simulation of 3D Space", Jul. 1993.

Steven P. Williams, et al., "New Computational Control Techniques and Increased Understanding for Stereo 3–D Displays", Stereoscopic Displays and Applications, SPIE vol. 1256, (1990), pp. 73–79.

C. Ware, "Dynamic Stereo Displays", ACM CHI'95 Proceedings Papers, 16 pages.

* cited by examiner

*Primary Examiner*—Mark R. Powell
*Assistant Examiner*—Thu Nguyen
(74) *Attorney, Agent, or Firm*—Oblon, Spivak, McClelland, Maier & Neustadt, P.C.

(57) ABSTRACT

According to the present invention, there is provided a stereoscopic display system for displaying a model stereoscopically using a pair of images seen from two different viewpoints and adapted for the right eye and the left eye, comprising P, gaze range determining means for determining a range to which a viewer is likely to fix his or her eyes with respect to the model, model move means for moving the model in a direction perpendicular to a display screen so that the gaze range determined by the gaze range determining means comes in a region in which stereoscopy is easy by changing data of the model, model enlargement/reduction means for enlarging/reducing a size of the model moved by the model move means according to a distance over which the model is moved by changing data of the model changed by the model move means, and image data creating means for creating image data to be displayed on the display according to data of model which has been moved by the model move means and whose size has been changed by the model enlargement/reduction means.

40 Claims, 23 Drawing Sheets

STEREOSCOPIC DISPLAY SYSTEM

BACKGROUND OF THE INVENTION

The present invention relates to a stereoscopic display system, and more particularly to a stereoscopic display system which automatically adjusts the stereoscopic display conditions in accordance with changes of a displayed scene, thereby reducing viewer's discomfort.

Conventionally, a binocular stereoscopic display system has been known in which images for right and left eyes (i.e., images viewed by the right and left eyes, respectively, and hereinafter, referred to as right- and left-eye images or right and left images) are displayed certain on a display screen, i.e., a two- dimensional plane, and both the images are fused by the viewer's brain into a single, three-dimensional image. This system has an essential problem of a discrepancy between accommodation and convergence of eyes. That is, the viewer's eyes are always adjusted so that they are focused on the display screen.

On the other hand, the position of a gazing point on which the viewer's right and left eyes are fixed by eye-ball movement (convergence) depends on the distance between the left and right images on a display screen, normally parallax; thus, in most cases, that point is not located on the display screen.

When such discrepancy is not so large, humans will have the capacity for fusing the right and left images into a single, three-dimensional image. When the degree of discrepancy is large, on the other hand, humans will become unable to fuse the right and left images, or, they will feel fatigue in their eyes. In such a case, it becomes impossible or difficult for them to obtain stereoscopic vision.

Therefore, users used to adjust the stereoscopic display conditions on a trial and error basis to solve the problem. This adjustment work is relatively easy for still images. However, for motion images, it is required to change the setting of the stereoscopic display conditions for each scene because the position of the viewer's gaze point changes with displayed objects of shooting. This is very troublesome. For motion pictures, therefore, the fact is that no change is made to the stereoscopic display conditions.

On the display screen in a stereoscopic display system are often displayed graphical user interface components such as character information, menus, buttons. However, when these graphical user interface components are not adequately displayed in accordance with the change of stereoscopic display conditions, viewers often have strange feeling for the images.

The recent development of the media like digital versatile disks (DVDs) has realized a system in which viewers can freely see the images from various viewpoints. The function for presenting good stereoscopic images are required in such a system. To realize the function, it is strongly desired to solve the above-described problems.

BRIEF SUMMARY OF THE INVENTION

It is an object of the present invention to provide a stereoscopic display system which implements a function of automatically adjusting stereoscopic conditions in accordance with scene changes to thereby relieve users of the burden of complicated operations and prevent the users getting eye fatigue.

It is another object of the present invention to provide a stereoscopic display system which implements a function of displaying graphical user interface (GUI) components so that the image of GUI components match with the model to thereby prevent the users getting eye fatigue a feeling of weariness.

It is still another object of the present invention to provide a method of creating information for changing stereoscopic conditions in accordance with changing scenes and a storage medium, such as a DVD, which stores the information created by that method together with right-eye and left-eye image information.

According to a first aspect of the present invention, there is provided a stereoscopic display system for displaying a model stereoscopically using a pair of images seen from two different viewpoints and adapted for the right eye and the left eye, comprising gaze range determining means for determining a range to which a viewer is likely to fix his or her eyes with respect to the model, model move means for moving the model in a direction perpendicular to a display screen so that the gaze range determined by the gaze range determining means comes in a region in which stereoscopy is easy by changing data of the model, model enlargement/reduction means for enlarging/reducing a size of the model moved by the model move means according to a distance over which the model is moved by changing data of the model changed by the model move means, and image data creating means for creating image data to be displayed on the display according to data of model which has been moved by the model move means and whose size has been changed by the model enlargement/reduction means.

According to this configuration, the gaze range including a gaze point is estimated by the gaze range estimating means and the model is moved in the direction of depth so that the gaze range enters the easiness-of-stereoscopy region. And the size of the model is changed by the model enlargement/reduction means according to the distance over which it has been moved. The model data thus changed is sent to the image data creating means which, in turn, produces image data to be displayed on the display screen.

The system should preferably further comprises depth distance reducing means for setting a scale in the direction of depth seen from the viewer so that at least the main part of the model that has been moved by the model move means enter the easiness of stereoscopy region.

According to this, the depth distance is changed so that at least the main(major) part of the model enters the easiness-of-stereoscopy region.

The system should preferably further comprises out-of-field data removing means for removing data on that portion of the model which is situated outside the field of view.

According to this configuration, since data on that portion of the model which is situated outside the field of view before the gaze point is estimated is removed, the gaze point can be estimated more quickly and accurately.

The system should preferably further comprises gaze range detecting means for detecting viewer's gaze direction and point on the images displayed on the display screen, and wherein the model move means moves the model in a direction normal to the display screen on the basis of the gaze point detected by the gaze range detecting means.

According to this configuration, since the stereoscopic conditions are calculated on the basis of the gaze point on actually displayed images, more suitable stereoscopic conditions can be calculated according to the personality of the viewer.

The system should preferably further comprises gaze range detecting means for detecting viewer's gaze direction and point on the images displayed on the display screen, and the out-of-field data removing means should preferably calculate a field of view on the basis of the gaze direction detected by the gaze range detecting means and remove data for the outside of the detected field of view.

According to this configuration, since the visual field is calculated on the basis of visual lines on actually displayed images, a model situated outside the field of view can be determined more suitably according to the viewer's personality and model data for the outside of the field of view can be removed. Thus, the gaze point can be estimated more accurately.

The system should preferably further comprises tone change means for changing the tone of the model displayed on the display screen so that the further away from the viewpoint, the closer the tone becomes the background tone.

According to this configuration, since the tone of the model is displayed so that the further away from the viewpoint, the closer the model tone becomes the background tone, the effect of seeing objects through air is achieved, providing more effective stereoscopy.

The model moving means should preferably include means, when a change occurs in the placement conditions of the model into the three-dimensional space seen from the viewer and the model moving means moves the model to fit the change, for preventing the amount of movement of the gaze range in the model exceeding one degree in terms of angle of convergence for a fixed period of time subsequent to the occurrence of the change in the placement conditions.

According to this configuration, since the amount of movement of the gaze point is limited for a prede- termined period of time, viewer's eyes fatigue is reduced.

The image data creating means should preferably have a function of determining stereoscopic conditions of graphical user interface components to be displayed on the display screen.

According to this configuration, since not only a model but also graphical user interface components are displayed stereoscopically, the viewer can be relieved of a feeling of strangeness resulting from mixture of three-dimensional images and two-dimensional images.

The system of the first aspect should preferably have means for varying a stereoscopic condition to diminish the stereoscopic effect.

The system should preferably further comprising means for shading-off/blurring the edges of right and left image of the model, where the model is situated at the edge of the display screen.

According to a second aspect of the present invention there is provided a stereoscopic method for displaying a pair of picture images seen from two different viewpoints with respect to a model on a display screen stereoscopically, comprising: gaze range determining step for determining a range to which a viewer is likely to pay attention with respect to a model; a model moving step for moving the model in a direction perpendicular to a display screen so that the gaze range determined by the gaze range determining step comes in a region in which stereoscopy is easy by changing data of the model; a model enlarging/reducing step for enlarging/reducing a size of the model moved by the model moving step according to a distance over which the model is moved by changing data of the model changed by the model moving step; and a data creating step for creating image data to be displayed on the display according to data of model which has been moved by the model moving step and whose size has been changed by the model enlarging/reducing step.

According to this configuration, the gaze range including a gaze point is estimated by the gaze range estimating step and the model is moved in the direction of depth so that the gaze range enters the easiness-of-stereoscopy region. And the size of the model is changed by the model enlarging/reducing step according to the distance over which it has been moved. The model data thus changed is sent to the image data creating step which, in turn, produces image data to be displayed on the display screen.

According to a third aspect there is provided a storage medium for storing- computer programs for displaying a pair of picture images seen from two different viewpoints with respect to a model on a display screen stereoscopically in computer system, comprising: a gaze range determining instruction means for giving instructions for determining a range to which viewers are likely to pay attention to the computer system; a model moving instruction means for giving instructions for moving the model in a direction perpendicular to a display screen so that the gaze range determined by the gaze range determining means comes in a region in which stereoscopy is easy by changing data of the model to the computer system; a model enlarging/reducing instruction means for giving instructions for enlarging/reducing a size of the model moved by the model move means according to a distance over which the model is moved by changing data of the model changed by the model move means to the computer system; and an image data creating instruction means for giving instructions for creating image data to be displayed on the display according to data of model which has been moved by the model move means and whose size has been changed by the model enlargement/reduction means to the computer system.

According to this configuration, the gaze range including a gaze point is estimated by the computer system and the model is moved in the direction of depth so that the gaze range enters the easiness-of-stereoscopy region. And the size of the model is changed by the model enlarging/reducing instruction according to the distance over which it has been moved. The model data thus changed is sent to the image data creating step which, in turn, produces image data to be displayed on the display screen.

According to a fourth aspect of the present invention, there is provided a stereoscopic display system for displaying a model stereoscopically using a pair of images seen from two different viewpoints, comprising: gaze range determining means for determining a range to which a viewer is likely to pay attention with respect to the model; a perspective transformation determining means for determining a perspective transformation method of the model data to the pair of images for the left eye and the right eye according to an output of the gaze range determining means; and an image data creating means for creating the image data to be displayed on the display according to a perspective transformation method determined by the perspective transformation determining means.

According to this configuration, image data easy to view stereoscopically can be produced by the perspective transformation without actually moving and enlarging/reducing the model.

According to a fifth aspect of the present invention, there is provided a stereoscopic display method for displaying a model stereoscopically using a pair of images seen from two different viewpoints, comprising: a gaze range determining step for determining a range to which a viewer is likely to pay attention with respect to the model; a perspective transformation determining step for determining a perspective transformation method of the model data to the pair of images for the left eye and the right eye according to an output of the gaze range determining means; and an image data creating step for creating the image data to be displayed on the display according to a perspective transformation method determined by the perspective transformation determining step.

According to this configuration, image data easy to view stereoscopically can be produced by the perspective transformation without actually moving and enlarging/reducing the model.

According to the sixth aspect of the present invention, there is provided a storage medium for storing computer programs for displaying a model stereoscopically using a pair of images seen from two different viewpoints, comprising: gaze range determining instruction means for giving instructions for determining a range to which a viewer is likely to pay attention with respect to the model to the computer system; a perspective transformation determining instruction means for giving instructions for determining a perspective transformation method of the model data to the pair of images for the left eye and the right eye according to an output of the gaze range determining instruction to the computer system; and an image data creating instruction means for giving instructions for creating the image data to be displayed on the display according to a perspective transformation method determined by the perspective transformation determining instruction.

According to this configuration, image data easy to view stereoscopically can be produced by the perspective transformation without actually moving and enlarging/reducing the model.

According to a seventh aspect of the present invention, there is provided a stereoscopic display system for displaying a pair of images seen from two different viewpoints stereoscopically, comprising: gaze area determining means for determining a range to which a viewer is likely to pay attention; an image conversion determining means for determining a method for image conversion so that the gaze area becomes a region in which stereoscopy is easy according to an output of the gaze area determining means; and an image data creating means for creating the image data to be displayed on the display according to an output of the image conversion determining means.

According to this configuration, the system can be applied to stereoscopic display of actually shot pictures and image data that allow the actually shot pictures to be easily viewed stereoscopically can be produced.

According to an eighth aspect of the present invention, there is provided a stereoscopic display method for displaying a model stereoscopically using a pair of images seen from two different viewpoints, comprising: gaze area determining step for determining a range to which a viewer is likely to pay attention; an image conversion determining step for determining a method for image conversion so that the gaze area becomes a region in which stereoscopy is easy according to an output of the gaze area determining step; and an image data creating step for creating the image data to be displayed on the display according to an output of the image conversion determining step.

According to this configuration, the system can be applied to stereoscopic display of actually shot pictures and image data that allow the actually shot pictures to be easily viewed stereoscopically can be produced.

According to a ninth aspect of the present invention, there is provided a storage medium for storing computer programs for displaying a pair of images seen from two different viewpoints stereoscopically in computer system, comprising: gaze area determining instruction means for giving instructions for determining a range to which a viewer is likely to pay attention to the computer system; an image conversion determining instruction means for giving instructions for determining a method for image conversion so that the gaze area becomes a region in which stereoscopy is easy according to an output of the gaze area determining instruction; and an image data creating instruction means for giving instructions for creating the image data to be displayed on the display according to an output of the image conversion determining means.

According to this configuration, the system can be applied to stereoscopic display of actually shot pictures and image data that allow the actually shot pictures to be easily viewed stereoscopically can be produced.

According to a tenth aspect of the present invention, there is provided an image data storage medium that is adapted for use with a stereoscopic display system adapted to display images on a display screen and furnish separate images to each eye of a viewer to thereby provide stereoscopy. The image data storage medium has a storage section for storing an image conversion method that allows a gaze area of images on which the viewer fixes his or her eyes to be positioned in an easiness-of-stereoscopy region for each scene.

According to this configuration, the storage medium can provide image data that allow easy stereoscopy by being applied to the stereoscopic display system of the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Before describing the embodiments of the present invention, the principles of stereoscopic display will be described below.

Figure 9:
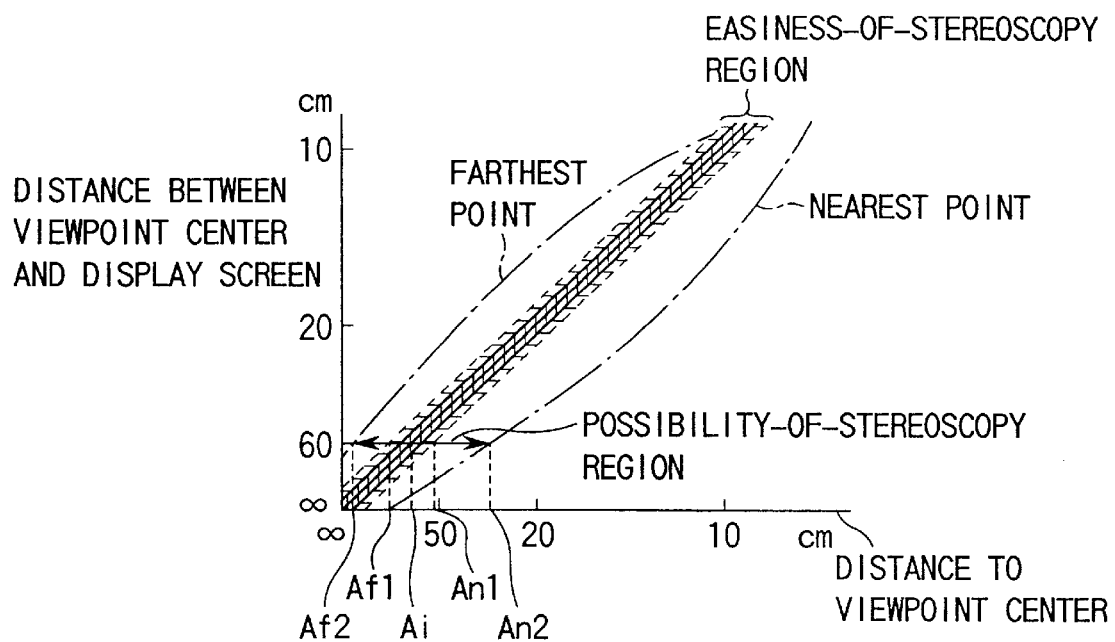
FIG. 9 is a graph showing a relationship between the depth distance between the display screen and the viewpoint center and the easiness (possibility)-of- stereoscopy region.

FIG. 9 is a graph showing a relationship between the depth distance between the viewpoint center (refers to the midpoint of the line connecting the viewer's right and left eyes) and the display screen and the possibility-of-stereoscopy region (easiness-of-stereoscopy region) expressed in terms of the distance from the viewpoint center (see "#THREE-DIMENSIONAL DISPLAY" Physiological Engineering 15 by Toyohiko Hatada in the technical journal "O plus E").

The possibility-of-stereoscopy region or the easiness-of-stereoscopy region is a region that makes the stereoscopic view of images possible or easy (in the direction of depth).

Here, the distance between the viewpoint center and the display screen corresponds to the depth distance between the viewpoint center and a point at which both the eyes are focused. The area of the possibility (easiness)-of-stereoscopy region indicates the allowable range of variations in angle of eye convergence. As can be understood from FIG. 9, the smaller the distance between the viewpoint center and the display screen, the narrower the possibility (easiness)-of-stereoscopy region becomes.

Consider here the case where the binocular stereoscopy display system is applied to a CAD system that simulates a three-dimensional model. In this case, suppose that the distance between the viewpoint center of the system user and the display screen is 60 cm. Then, the possibility-of-stereoscopy region extends in the depth distance from the viewpoint center from An2 (cm) to Af2 (cm). The easiness-of-stereoscopy region, i.e., the region in which stereoscopic vision is allowed with little eye fatigue, is limited to a range from An1 (cm) to Af1 (cm) in the depth distance from the viewpoint center.

However, the model (an object of display) is not always located between An1 and Af1. When the model is not located between An1 and Af1, it is required to change the stereoscopic conditions so that the entire model will enter the region in which the stereoscopic image is easy to view.

On the other hand, in the case of usual images with no three-dimensional position data (actually shot pictures such as photographs or video pictures), the region where stereoscopic images are easy to view are expressed in terms of a critical value of the amount that right and left images are offset with respect to each other. According to a literature (The CrystalEyes Handbook: L. Lipton, StereoGraphics Corp. 1991), the critical value is on the order of 1.5 degrees in terms of visual angle. It will not exceed two degrees at a little higher estimate. In making an image perceived behind the display screen, the maximum amount that the right and left images are offset corresponds to the interocular distance. If, therefore, the viewpoint center is one meter or more away from the display screen, all the models (objected display) behind the screen will be in the easiness-of-stereoscopy region. In making an image perceived before the display screen, this condition will not be met if the image protrudes, to some degree, from the display screen. As with the three-dimensional model, therefore, in order to make a stereoscopic image easy to view, it is required to appropriately change the offset amount of right and left images and change the stereoscopic conditions so that the offset amount will always become less than the critical value.

However, the conventional stereoscopic display system is not equipped with means of controlling the stereoscopic conditions in accordance with changes in displayed images. For this reason, the cinematographer has to shoot images while taking subsequent easier viewing into consideration, and the viewer himself cannot change images on an interactive basis.

The present invention performs functions of controlling the stereoscopic conditions on the basis of information on gaze points(fixing point/range) for scenes and generating stereoscopic images that is easy for viewers to see.

Hereinafter, the preferred embodiments of the present invention will be described with reference to the accompanying drawing.

Figure 1:
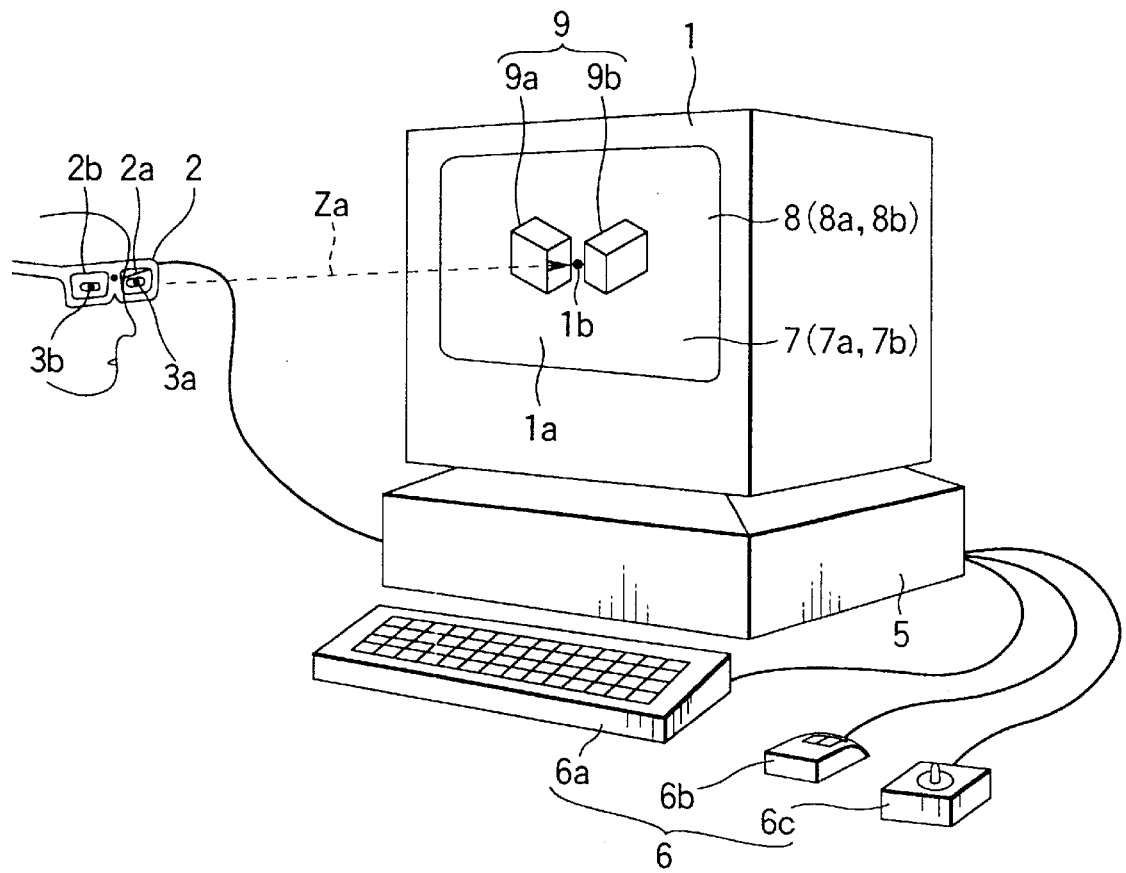
FIG. 1 is a schematic illustration of a stereoscopic display system according to a first embodiment of the present invention.

Reference will now be made to FIG. 1 to give the outline of the stereoscopic display system of the present invention. Hereinafter, the stereoscopic display system is supposed to be of a time-multiplexing type.

FIG. 1 shows a state in which a left-eye picture image 7a and a right-eye picture image 7b are displayed simultaneously on a display screen (which may be a normal CRT). The left picture image 7a consists of a left background 8a and a left model image 9a on the background. Likewise, the right picture image 7b consists of a right background 8b and a right model image 9b on the background.

Actually, the left picture image 7a and the right picture image 7b are displayed alternately at a high speed; thus, the viewer will recognize one picture image 7, one background 8 and one image 9 as being displayed three-dimensionally.

To the display unit 1 is connected an operations unit 5 for producing image signals, which calculates the stereoscopic conditions of the image 9, processes left and right image data on the basis of the calculated stereoscopic conditions, and provides to the display unit 1 the resulting left and right picture images 7a and 7b alternately at regular intervals.

To the operations unit 5 are connected to input means 6, such as a keyboard 6a, a mouse 6b, and a joystick 6c, which are adapted to provide commands to rotate, move and designate the coordinates of an image displayed on the screen 1a of the display unit 1.

The stereoscopic system includes liquid-crystal shutter eyeglasses 2, which are adapted to block light directed onto each of the right and left eyes alternately in synchronization with switching between the left and right picture images 7a and 7b. That is, the viewer's left eye 3a views only the left image 7a of the image 7 displayed on the display screen 1a via the left lens 2a of the liquid-crystal shutter eyeglasses 2, while the right eye 3b views only the right image 7b in the image 7 displayed on the display screen la via the right lens 2b of the eyeglasses 2.

If the proper stereoscopic conditions have been set up, the viewer will be able to perceive a stereoscopic image by fusing the left and right model images 9a and 9b in the brain. In this case, the distance Za between the viewpoint center and the center 1b of the display screen la is set constant (approximately 60 cm). The distance Za may vary with viewers, depending on their positions. In this specification, the following description will be given on the assumption that the distance Za is constant.

Hereinafter, an example of a configuration of the stereoscopic display system will be described with reference to FIG. 2.

Figure 2:
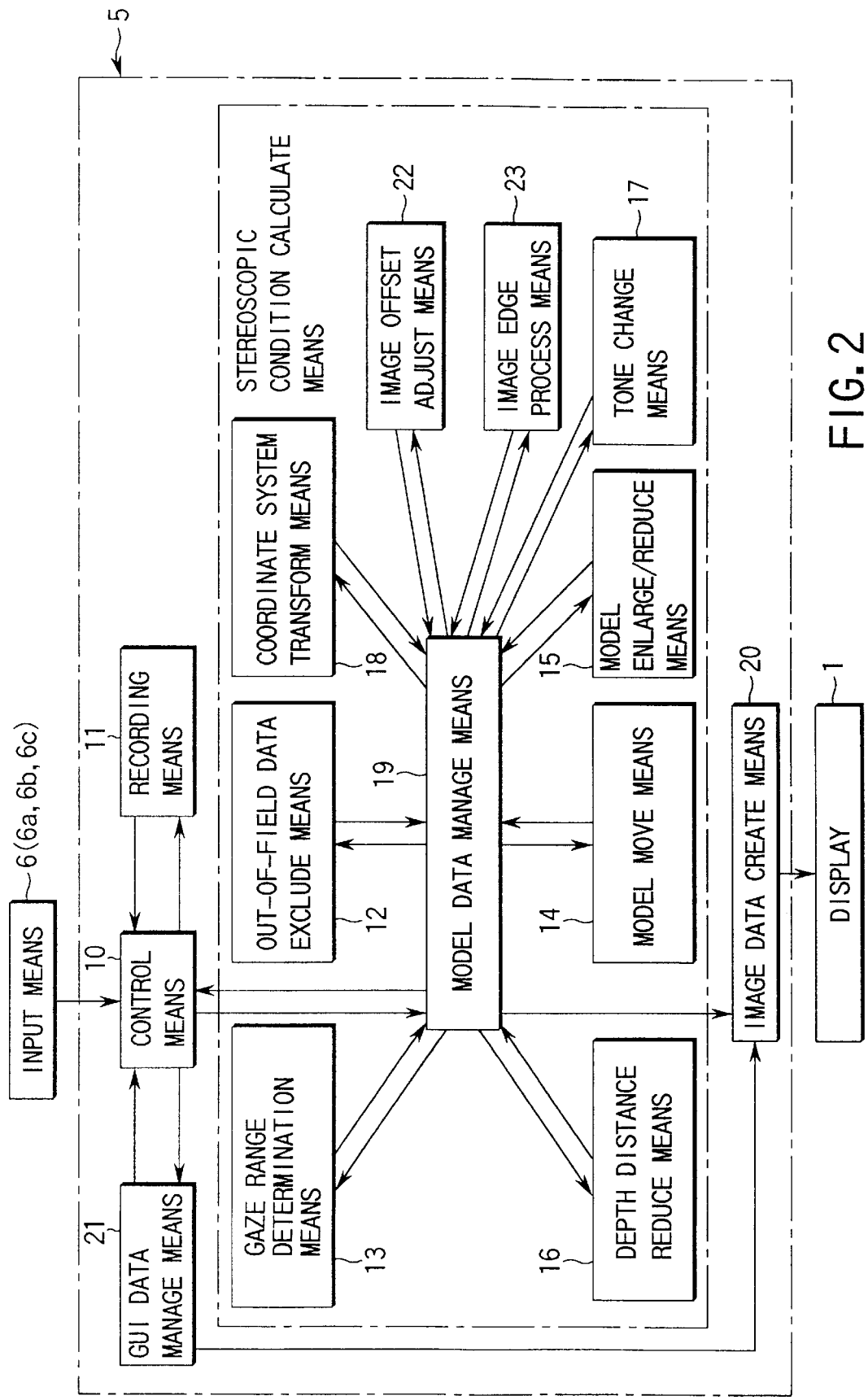
FIG. 2 is a block diagram of the stereoscopic display system of FIG. 1.

As shown in FIG. 2, the system has a control means 10 that performs control of the whole system. The control means receives commands entered from the input means 6 and produces and issues instructions to the system.

To the control means 10 is connected a recording means 11 which records information about the shape, size and arrangement of a model present in three-dimensional space. The control means receives such model information from the recording means.

To the control means 10 is connected a GUI data manage means 21 that manages data on graphical user interface components such as character information, menus, buttons, and the like. The control means receives such data from the GUI data manage means.

The system has a stereoscopic condition calculating section. This section comprises: an out-of-field data exclude means 12 that excludes data on a model present outside the field of view; a gaze range determination means 13 that estimates a gaze range (including a gaze point) over which the left and right eyes are fixed on the basis of model data; a model move means 14 that performs a process of moving the model in the direction of depth; a model enlarge/reduce means 15 that performs a process of enlarging or reducing the model; a depth distance reduce means 16 that sets up the scale of the model space in the direction of depth so that the main portion of the model will be included in the easiness-of-stereoscopy region; a tone change means 17 that changes the tone of the model to impart to the displayed image an effect of seeing objects through air; a coordinate system transform means 18 that performs a process of putting a model placed in the coordinate system of three-dimensional space into the coordinate system for the stereoscopic display system (stereoscopic coordinate system); an image offset adjust means 22 that adjusts the offset amount of the right and left images to eye fatigue; and an image edge process means 23 that performs a process of shading-off/blurring the edges of the display screen.

The out-of-field data exclude means 12, the gaze range determination means 13, the model move means 14, the model enlarge/reduce means 15, the depth distance reduce means 16, the tone change means 17, the coordinate system transform means 18, the image offset adjust means 22 and the image edge process means 23 are connected to the model data manage means 19, which is responsive to instructions from the control means 10 to send data received from those means 12 through 18 to an image data create means 20.

The image data create means 20 creates right and left image data on the basis of the model data received from the model data manage means 19 and sends it to the display 1.

The means 10 through 21 are implemented by the operations unit 5 in the stereoscopic system. A computer system may be installed with a computer program that describes procedures that implement the means 10 to 21.

Next, the operation of the present embodiment will be described.

Figure 3:
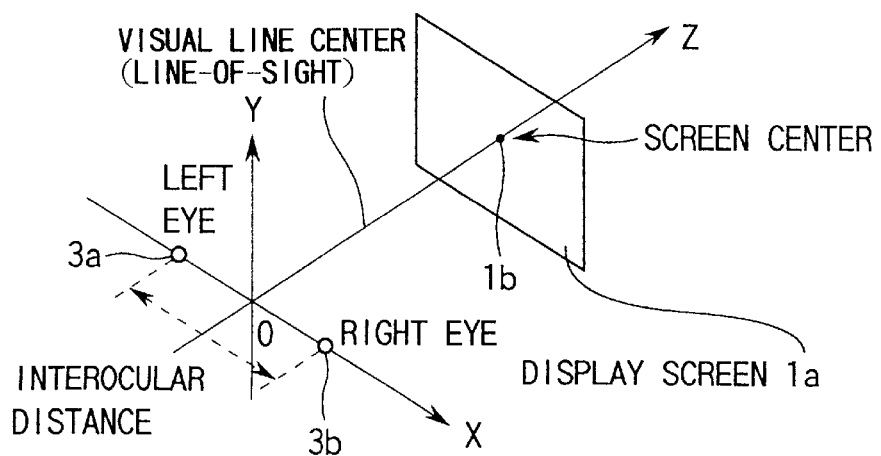
FIG. 3 shows a coordinate system used in the stereoscopic display system.

Before describing the operation specifically, the coordinate system of the stereoscopic system used in this specification will be described with reference to FIG. 3. As shown in FIG. 3, the coordinate system of the stereoscopic system is represented by the XYZ coordinate system with the midpoint O between left and right eyes 3a and 3b taken as the origin.

In this coordinate system, the X axis is coincident with the line connecting the left and right eyes 3a and 3b and extends in parallel with the display screen la of the display unit 1. The positive direction is taken in the direction of the left eye 3a. The Z axis is coincident with the line connecting the origin O and the center 1b of the display screen 1a. The direction from the origin O to the center 1b is taken as positive. The Z axis is aligned with the center of visual lines.

The Y axis is normal to the XZ plane. The positive direction is coincident with the up direction. The length of the line connecting the left eye 3a and the right eye 3b is termed the interocular distance, and the midpoint of the line connecting the left and right eyes, i.e., the origin O, is termed the viewpoint center.

The operation of the present embodiment will now be described with reference to a flowchart of FIGS. 4A and 4B.

Figure 4A:
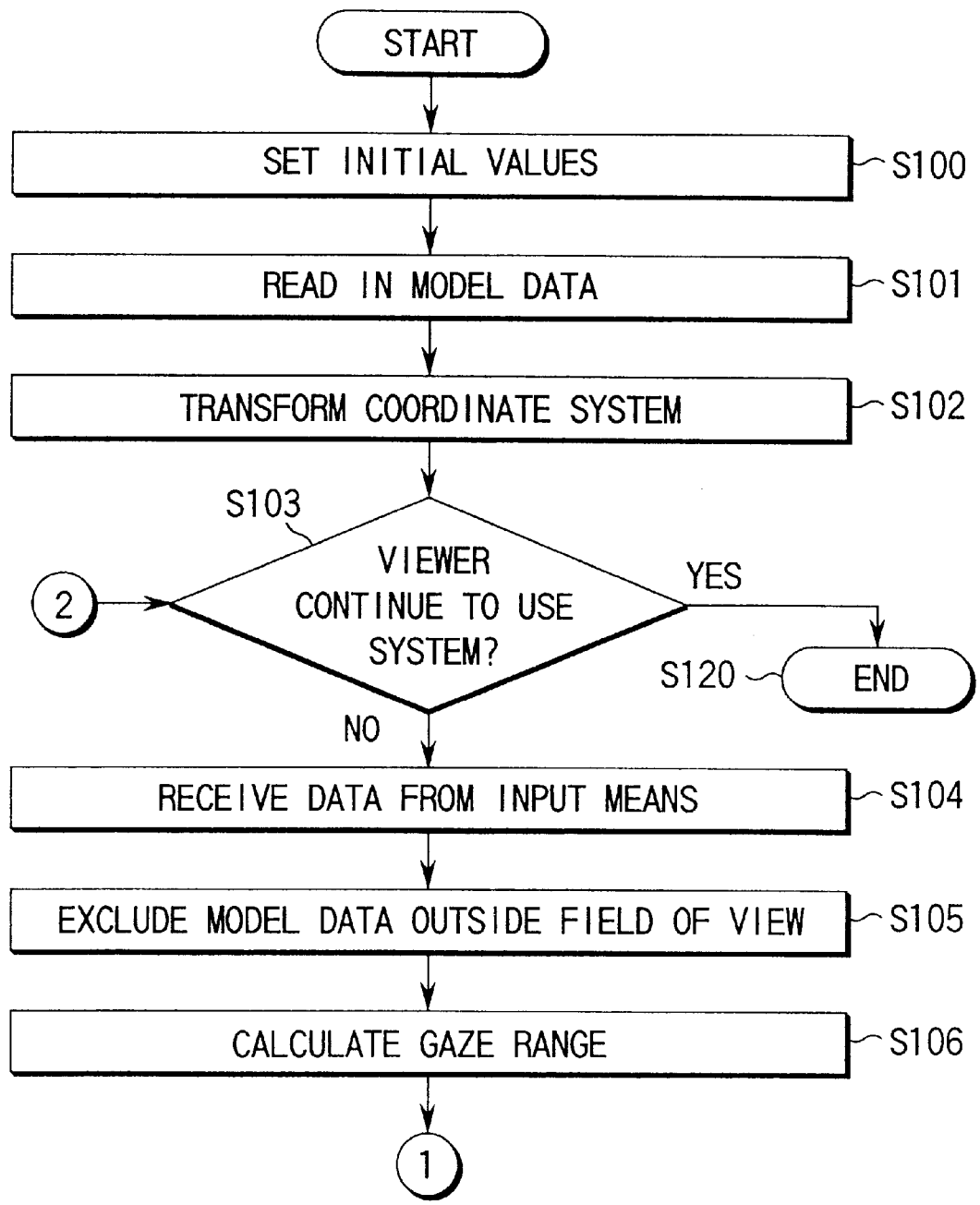
FIGS. 4A and 4B form a flowchart for the stereoscopic condition calculation processing in the first embodiment.
Figure 4B:
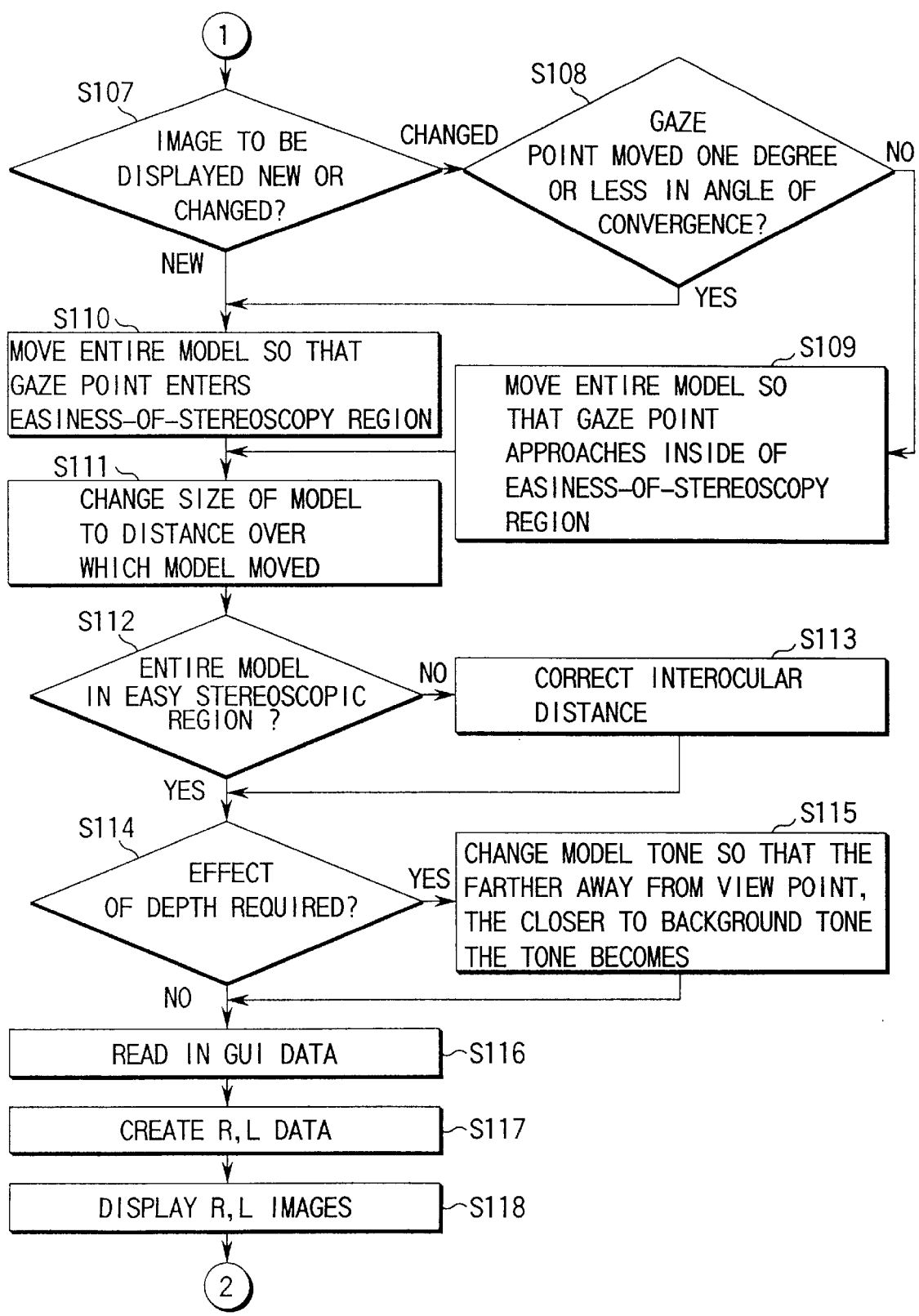

As shown in FIG. 4A, at system startup, initial values which are usually stored in the recording medium 11, are entered by the input means 6 into the control means 10 (step S100). Initial values include an initial value of the interocular distance which is used as the criterion for later determining the offset amount of the left and right images 7a and 7b, data as to how to place a model placed on a coordinate system of three-dimensional space on the stereoscopic coordinate system, the distance Za (=60 cm) between the viewpoint center O and the center 1b of the display screen 1a, and the like. The initial interocular distance is set to the human average interocular distance, i.e., 6 cm.

On termination of entry of the initial values, the control means 10 reads model data associated with the coordinate system in three-dimensional space from the recording means 11 (step S101) and sends it to the model data manage means 19 together with the initial values. The model data include the dimensions and shape of the model, the placement state of the model in the coordinate system of three-dimensional space, and tones of the model (including all of hue, lightness, and saturation; this remains unchanged throughout the specification).

Figure 5:
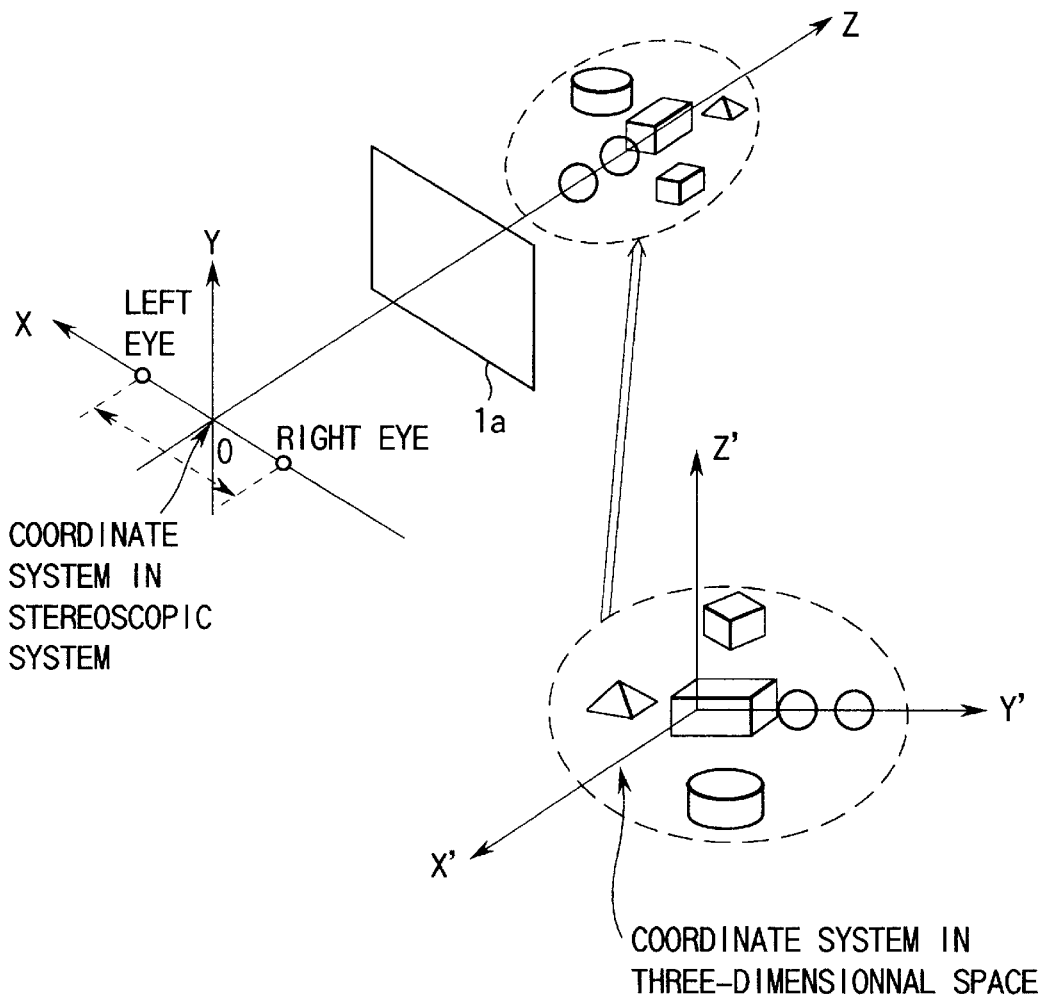
FIG. 5 shows the operation of the coordinate transformation means.

Next, the model data manage means 19 sends the initial values and the model data to the coordinate system transform means 18, which, in turn, places the model in the stereoscopic coordinate system as shown in FIG. 5 based on the initial values and the model data (step S102).

Next, data are entered from the input means 6 through the control means 10 into the model data manage means 19 so as to adjust the position and posture of the model that is placed in the stereoscopic coordinate system (step S104). The posture of the model means a direction that it faces.

Figure 6A:
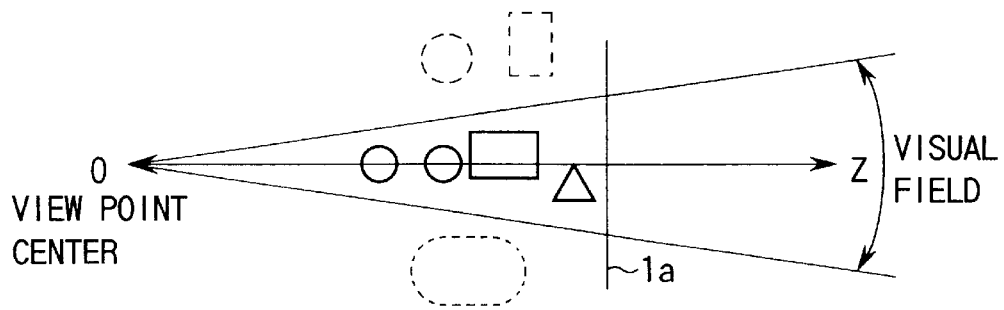
FIGS. 6A through 6D show the flow of processes in the stereoscopic condition calculating section.
Figure 6B:
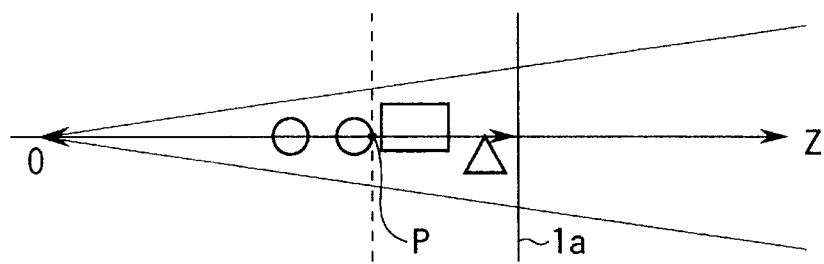

The model data manage means 19 next sends data on the model placed in the stereoscopic coordinate system to the out-of-field data exclude means 12, which, of the received model data, excludes data for models (indicated by broken lines in FIG. 6A) that exist outside the field of view (step S105). The resulting model data is returned to the model data manage means 19 to rewrite the original model data in it.

The model data manage means 19 sends the model data to the gaze range determination means 13, which, on the basis of the placement conditions of the model in the three-dimensional space and the initial values received from the model data manage means 19, estimates the gaze range in the direction of depth of viewer's eyes on the model placed in the stereoscopic coordinate system (step S106). In this embodiment, the estimation of the gaze range may be performed by either of two approaches discussed below.

Figure 7:
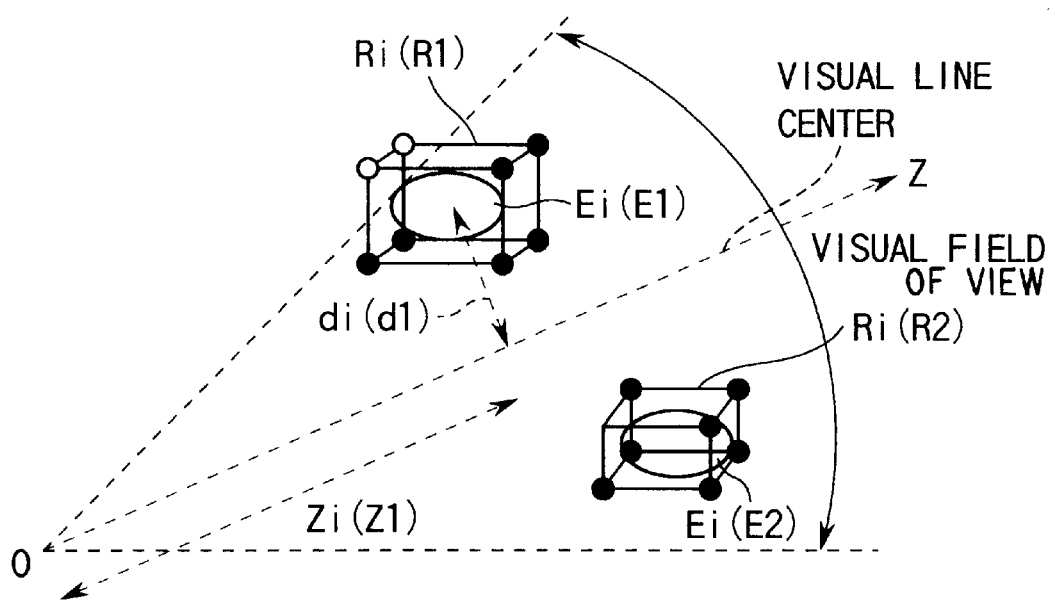
FIG. 7 shows a method of estimating a gaze point on which right and left eyes are fixed.

In the first approach, as shown in FIG. 7, boundary boxes Ri (i=1, 2, ..., N) are first set up each of which envelops a corresponding one of elements Ei contained in the model.

Next, weights Wi of representative points of elements Ei enveloped by the boundary boxes Ri are sought with each boundary box as a unit. In seeking the weights, the number of vertexes of each boundary box Ri is calculated first. The number of vertexes of a boundary box is normally eight. For a boundary box R1 that resides across the boundary of the field of view as shown in FIG. 7, however, only the number of vertexes that reside inside the field of view (indicated by black dots) is calculated.

Next, a coefficient that represents the complexity of the element Ei is calculated. When each element is a structured geometric model element, the coefficient is calculated from the number of sides or surfaces of the element Ei. When each element is an image, the coefficient is calculated from spatial frequencies. The coefficient is multiplied by the number of vertexes of the boundary box Ri, thereby calculating the weight Wi for each boundary box.

Next, the coordinates xi, yi and zi of the representative point of the boundary box Ri are sought. The Z-axis coordinate of the representative point, Zi (of the coordinates xi, yi and zi) is defined as the distance between the element Ei and the viewpoint center. The coordinates of the representative point of the element Ei are taken as the coordinates of the center of gravity of the element Ei.

Next, the distance between the representative point of the boundary box Ri and the visual-line(visual-line) center (the Z axis of the stereoscopic coordinate system) di is calculated.

Next, using the weights Wi of the representative points of the boundary boxes Ri, the distances Zi between the representative points and the viewpoint center, and the distances di between the representative points of the boundary boxes Ri and the Z axis, the coordinate Zd of the gaze point in the direction of depth is calculated by $$Zd = \frac{\sum_{i=1}^{N} Zi \times Wi \times di}{\sum_{i=1}^{N} Wi \times di} \quad (1)$$

where N is the number of the boundary boxes, Zi is the coordinate of the representative point of the boundary box Ri in the direction of depth, Wi is the weight of the boundary box Ri, and di is the distance between the representative point of the boundary box Ri and the Z axis.

The standard deviation of the depth coordinates of the representative points is calculated by $$\sigma = \sqrt{\frac{\sum_{i=1}^{N} \{(Zi - Za)^2 \times Wi \times di\}}{N \times \sum_{i=1}^{N} (Wi \times di)}} \quad (2)$$

Using the depth coordinate Zd of the reference point, the standard deviation, and the minimum value Zi0 and maximum value Zi1 of Zi, the gaze range is calculated to be $$\max(Zi0,(Zd-a\times\sigma))\sim\min((Zd+a\times\sigma), Zi1) \quad (3)$$

where max(a, b) is a function that returns a greater one of a and b and min(a, b) is a function that returns a smaller one of a and b.

In equation (3), a is a real coefficient and usually takes a value in the range from 0 to 2.

Figure 8:
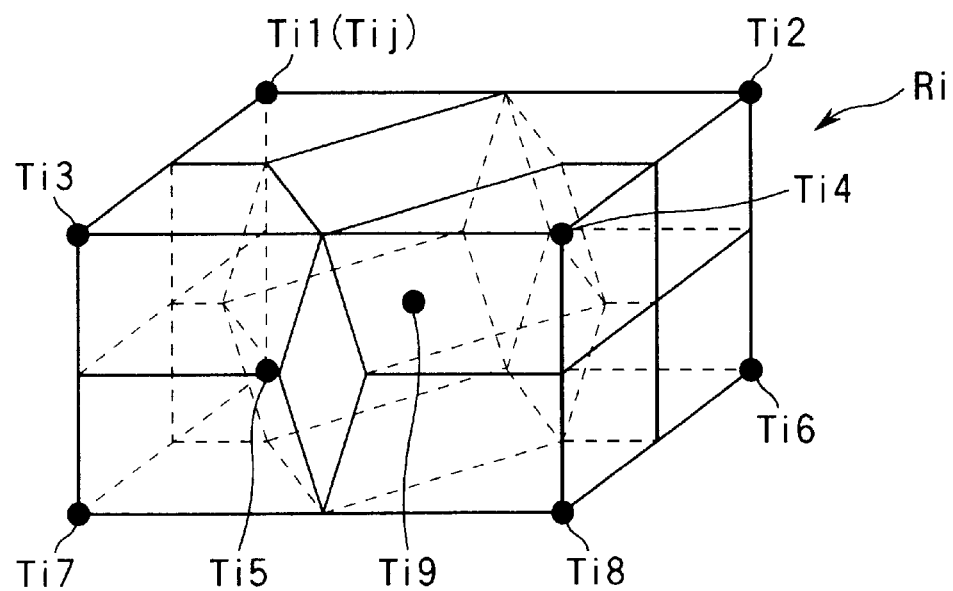
FIG. 8 shows a method of estimating the gaze point.

In the second approach, the voronoi polyhedrons based on representative points Tij are first created in the boundary box Ri, which is shown in FIG. 8. The Voronoi polyhedron is for dividing space in the boundary box Ri into the following regions in relation to a given number (=n) of points (the case where the regions associated with points Tij (j=1, 2, ..., n) are represented by Vi(Tij)).

Vi (Tij)={T|d(Ti,Tij)<d(Ti,Tik)}(k=1n) k≠j where Ti indicates a point inside the boundary box Ri and d(Ti, Tij) indicate the distances between the points Tij and Ti.

That is, in the boundary box Ri, the point Ti included in the region Vi(Tij) is closer to Tij than any other representative point.

Next, a coefficient that represents the complexity of the element Ei enveloped by the divided regions Vi(Tij) is calculated. This coefficient is calculated from the number of edges or surfaces of the element Ei enveloped by the regions Vi(Tij) when each element is a structured geometric model element. When each element is represented only on an image, the coefficient is calculated from spatial frequencies. The coefficient is used as the weight Wij of each of the regions.

Next, the distance Zij of the representative point Tij from the viewpoint center is defined by the Z-axis coordinate zij.

Next, the distance dij between each representative point and the visual-line(visual line) center (the Z axis of the stereoscopic coordinate system) is calculated.

Next, using the weights Wij of the representative points Tij of the boundary box Ri, the distances Zi between those representative points and the viewpoint center O, and the distances dij between the representative points Tij of the boundary box Ri and the visual-line center (Z axis), the coordinate Zd of the gaze point in the direction of depth is calculated by $$Zd = \frac{\sum_{i=1}^{N} \cdot \sum_{j=1}^{9} (Zij \times Wij \times dij)}{\sum_{i=1}^{N} \cdot \sum_{j=1}^{9} (Wij \times dij)} \quad (4)$$

where N is the number of the boundary boxes, Zij is the coordinate of the representative point of the j-th region of the boundary box Ri in the direction of depth, Wij is the weight of the j-th region of the boundary box Ri, dij is the distance between the j-th region of the boundary box Ri and the Z axis, and i indicates the i-th boundary box Ri.

The standard deviation is calculated by $$\sigma = \sqrt{\frac{\sum_{i=1}^{N} \cdot \sum_{j=1}^{9} \{(Zij - Zd)^2 \times Wij \times dij\}}{N \times \sum_{i=1}^{N} \cdot \sum_{j=1}^{9} (Wij \times dij)}} \quad (5)$$

Thus, the gaze range is calculated in terms of Zd, σ, Zi0, and Zi1 as follows:

$$\max(Zio,(Zd-a\times\sigma))\sim\min((Zd+a\times\sigma), Zij) \quad (6)$$

In equation (6), a is a real coefficient and usually takes a value in the range from 0 to 2.

In the above expressions, the weight W and the distance d between the representative point and the visual-line center are multiplied together. Alternatively, use may be made of an expression such that a×W+b×d (a and b are each a coefficient).

In both the first and second approaches, Ri is assumed to be a boundary box that envelops a model element Ei (i=1, 2, . . ., N). Alternatively, the boundary box Ri may be assumed to be one that envelops part of the element Ei, for example, its surface that is visible from the viewpoints.

In the following, description is given of a method of moving the model with respect to the reference point of the gaze range (hereinafter referred to as the gaze point), i.e., with respect to a=0, by way of example.

The coordinate of the gaze point in the direction of depth, Zd, obtained by the first and second approaches, is sent to the model data manage means 19 and stored in it.

Next, the model data manage means 19 passes the model data and the coordinate Zd of the gaze point in the direction of depth to the model move means 14. The model move means then makes a decision as to whether an image to be displayed this time, i.e., an image that is a current object of the above-described processing, is a new image or a changed image (step S107). The changed image refers to an image obtained by simply rotating the image displayed just before or changing its posture (step S104), that is, an image that has continuity with the immediately preceding image. The new image refers to any other image.

Figure 6C:
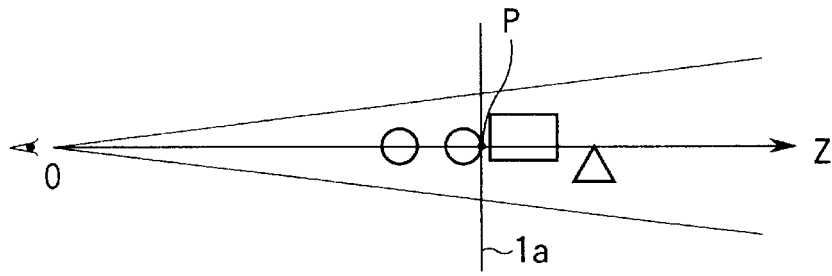
Figure 6D:
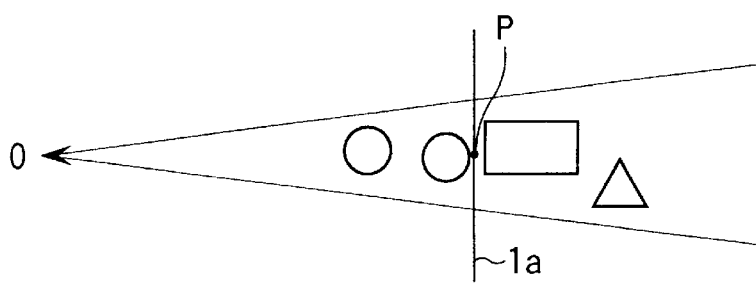

When the image is a new image, the model move means 14 parallel moves the entire model in the direction of depth (in the direction of the Z axis) as shown in FIG. 6C so that the gaze point P will enter the easiness-of-stereoscopy region shown in FIG. 8, on the basis of the Z-axis coordinate Zd of the gaze point in the direction of depth calculated by the gaze range determination means 13 (step S110). In this embodiment, since the distance between the viewpoint center O and the center of the display screen 1a is 60 cm, it is necessary that the gaze point be located in the range of An1 cm to Af1 cm in the depth distance from the viewpoint center O indicated by the abscissa of the graph of FIG. 9.

When the current image is a changed image, the model move means 14 makes a decision as to whether, on the assumption that the process in step S110 was performed at it was, the depth position of the gaze point will move one degree or more in terms of angle of convergence relative to the depth position of the gaze point for the image that immediately precedes the image that is currently to be processed (step S108). When the decision is less than one degree, the process in step S110 is performed as with the new image. The reason why the criterion for decision is set to one degree is that the movement of the gaze point of one degree or more in terms of angle of convergence causes severe viewer's eye fatigue. Since the degree of eye fatigue vary from viewer to viewer, the criterion for decision may be set to a value less than one degree, e.g., 0.5 degrees.

When the decision is more than one degree, on the other hand, the model move means 14 adds a predetermined limitation to the movement of the model. That is, in this case, the model move means 14 parallel moves the entire model in the direction of depth (Z axis) so that the gaze point moves as close to the easiness-of-stereoscopy region as possible while imposing a limitation such that the gaze point after movement is not distant from the gaze point for the immediately preceding image by one degree or more in terms of angle of convergence (step S109). The position data of the model thus moved (with notification that a limitation has been imposed on the movement of the gaze point, if so) is sent to and stored in the model data manage means 19.

The model data manage means 19 then sends data on the distance over which the model has moved to the model enlarge/reduce means 15. Upon receipt of this data, the model enlarge/reduce means changes the size of the model according to that distance (step S111). If, for example, the gaze point P is made coincident with the display screen, the size of the model is changed in proportion to the distance between the viewpoint center and the gaze point so that a relation is established such that (size of model prior to movement):(size of model after movement)=(Z-axis coordinate Zd of gaze point prior to movement): (Z-axis coordinate of gaze point after movement). This makes the image size of the model on viewer's retina remain unchanged before and after the movement; thus, the viewer will not notice the movement of the model in the direction of depth. Thus, even when an attempt is made to rotate the model for viewing from different angles, the viewer will not have a feeling of strangeness such that the model suddenly comes up or goes away at the time of rewriting the image. This is therefore useful in reducing the viewer's eye fatigue. The data on the size of the model thus changed is sent to the model data manage means 19 and stored in it.

Further, it is not necessary to always change the size of the model so that the apparent model size remain unchanged.

The model manage means 19 then sends the model position data and the model size data to the depth distance reduce means 16. Here, the perceptual distance of depth is reduced by changing the interocular distance. The model manage means 19 makes a decision from the graph of FIG. 10 as to whether or not the entire model has been placed within the easiness-of-stereoscopy region, on the basis of the interocular distance set as the initial value.

Figure 11A:
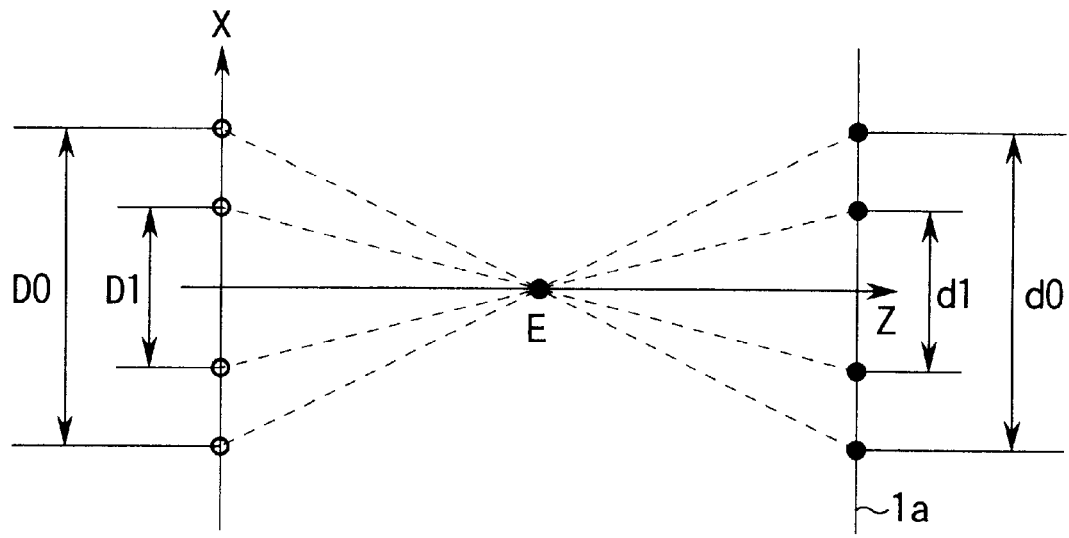
FIGS. 11A and 11B show changes in the amount that right and left images are offset with respect to each other on the display screen when the interocular distance is corrected.
Figure 11B:
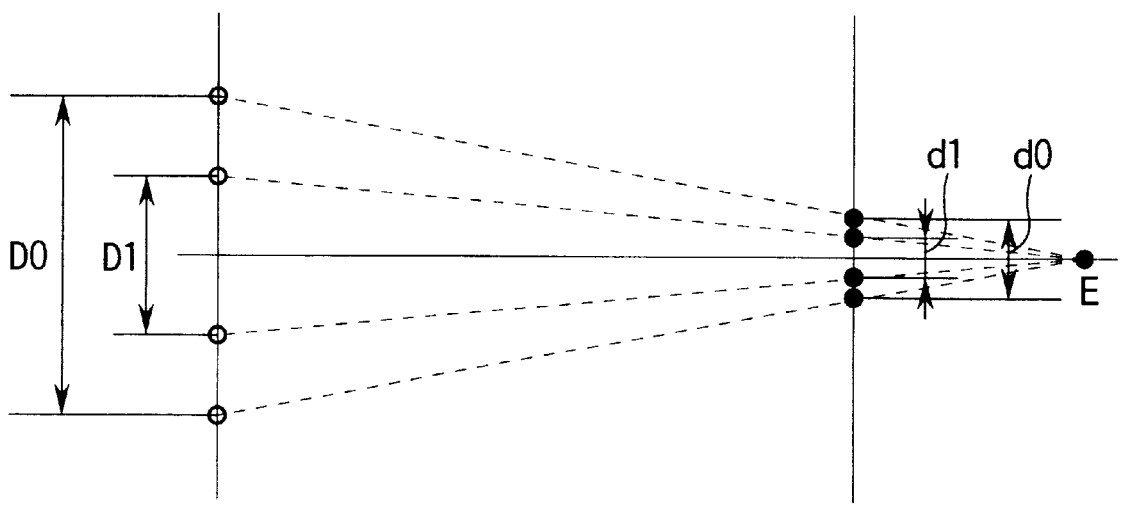

When part of the model is outside the easiness-of-stereoscopy region, the depth distance reduce means 16 corrects the initial value of interocular distance so that it becomes reduced (step S113). By reducing the interocular distance from D0 to D1, the offset amount of the left and right images is reduced from do to d1 as shown in FIGS. 11A and 11B. Whether the stereoscopy is easy depends on whether that offset falls within a predetermined range. Thus, reducing the interocular distance appropriately will allow the entire model to fit into the easiness-of-stereoscopy region.

Figure 10:
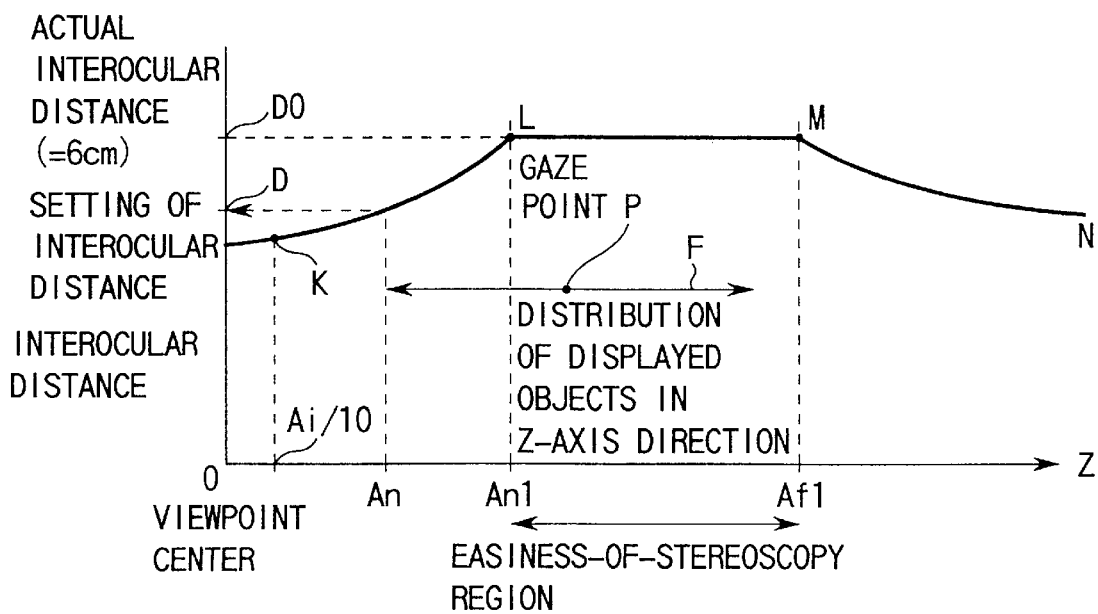
FIG. 10 is a graph illustrating a method of correcting the interocular distance.

FIG. 10 is a graph showing the criterion for correcting the interocular distance with the distance between the viewpoint center and the display screen held constant. The axis of ordinate indicates the interocular distance, and the axis of abscissa indicates the depth distance between the model and the viewpoint center. How to create this graph will be discussed below.

First, the depth distances An1 and Af1 between both ends of the easiness-of-stereoscopy region and the viewpoint center O corresponding to the distance between the viewpoint center O and the display screen 1a (60 cm in the present embodiment) are sought. Thereby, the depth distance between each end of the easiness-of-stereoscopy region and the viewpoint center O for the original interocular distance D0 set as the initial value is obtained. Thus, points L and M in FIG. 10 are determined.

Figure 12A:
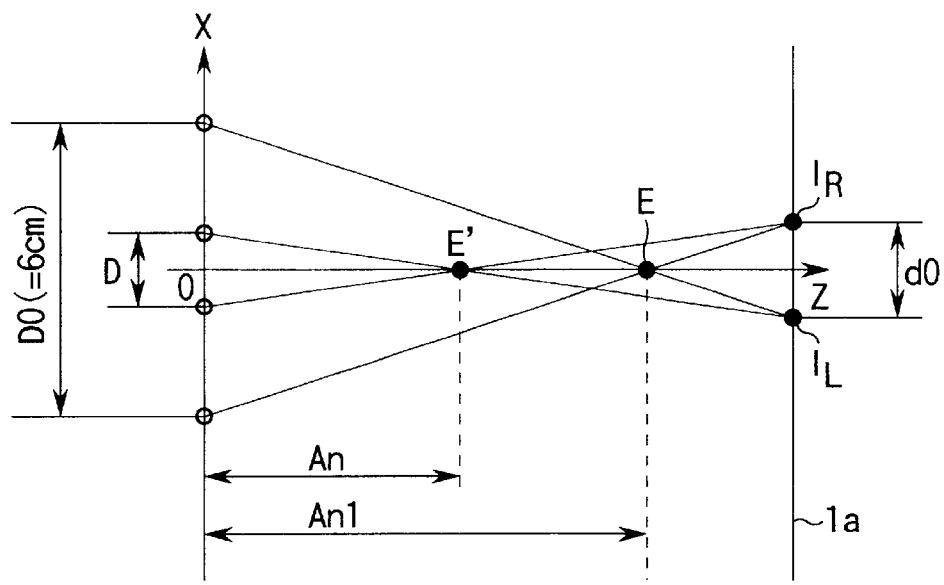
FIGS. 12A and 12B show a method of creating the graph of FIG. 10.

Next, assuming that, in FIG. 12A, the model element E locates at the front end of the easiness-of-stereoscopy region on the viewer side, the positions of the left image IL and the right image IR for the element E on the display screen 1a are sought to calculate the amount d0 that the images IR and IL are offset with respect to each other. This offset d0 corresponds to the maximum allowable offset for images IL and IR indicating an element that is located at the front end of the easiness-of-stereoscopy region on the viewer side.

Next, as shown in FIG. 12A, considers a model element E' that is located at a point that is at a distance of An from the viewpoint center O, that is, the point is on the viewer's side and outside the readiness-of-stereoscopy region. Straight lines that extend from the images IL and IR and intersect the element E' are then drawn to seek the intersections of the straight lines and the X axis. The distance D between those intersections is the maximum value of the interocular distance which provides easy stereoscopy for the model element E' that is located at a distance of An from the viewpoint center O.

When the model element E' is very close to the viewpoint center, for example, when the depth distance between the viewpoint center and the element E' is less than 1/10 of the distance between the viewpoint center and the display screen, the interocular distance becomes very small, so that the three-dimensional effect is lost due to little parallax. When the depth distance between the model element E' and the viewpoint O is less than 1/10 of the distance Ai, the interocular distance is set to the value when the depth distance between E' and O is 1/10 of Ai. When a model is very close to the viewpoint center, its apparent size increases, so that a portion of the model which is pushed out of the field of view increases and the shape recognition as a whole becomes difficult. Thus, even if images which are offset more than the maximum allowable offset amount are displayed, the viewer will not care about such an image.

A curve KL in the graph of FIG. 10 can be defined by changing the depth distance An from the viewpoint center O, seeking the maximum value of the interocular distance D that corresponds to the changed distance An, and plotting the distance An and the interocular distance D for An on the graph. Using this curve, the interocular distance can be determined which allows the stereoscopy of an element that is located in front of the easiness-of-stereoscopy region.

Figure 12B:
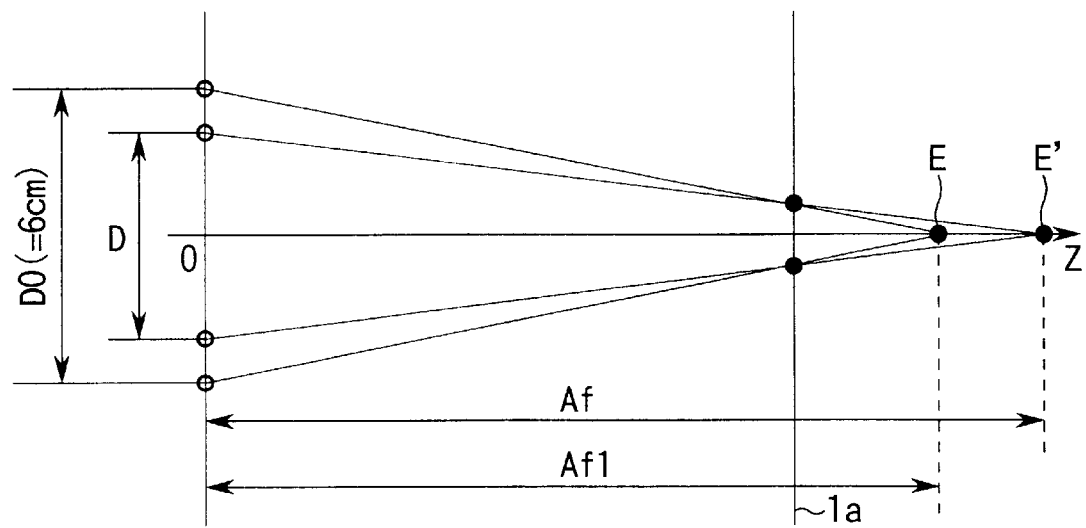

Further, by referring to FIG. 12B, a curve MN can be determined in the same way as the above approach, which indicates the criterion for correcting the interocular distance for facilitating the stereoscopy of an element that is located beyond the back end of the easiness-of-stereoscopy region.

On the basis of the graph of FIG. 10 thus obtained, the depth distance reduce means 16 corrects the initial value of the interocular distance so that it becomes small. As shown in FIG. 10, suppose that model elements are distributed over a range in depth direction centered at the gaze point P and indicated by arrows F. In this case, if, when the depth distance between the viewpoint center O and an element that is situated at the most front end (on the viewer side) of that range is An, the interocular distance is set to D according to the curve KL, then all the model elements can be easily viewed stereoscopically.

Suppose, for example, the case where only one element is situated far behind the other elements. In such a case, it is not necessarily required that all the elements be placed in the easiness-of-stereoscopy region. That is, it is allowed to place at least main model elements in the easiness-of-stereoscopy region.

When the entire model is placed in the easiness-of-stereoscopy region at the termination of step S111, the depth distance reduce means 16 keeps the interocular distance as it was initially set.

The interocular distance set in the above manner is sent to the model manage means 19.

For processing based on the whole gaze range (as opposed to the gaze point P), reference can be made to the position of the front end of the gaze range instead of the model element situated nearest to the viewer and to the position of the back end of the gaze range instead of the farthest model element, thereby allowing the movement and enlargement of models and the change of the interocular distance in the same way as above.

The model data manage means 19 sends the model position data, model size data, and interocular distance data to the tone change means 17, which, in turn, makes a decision as to whether or not the effect of seeing objects through air is required with an image being displayed (step S114).

It is when many model elements are situated behind the gaze point that the effect of seeing objects through air is needed. In such a case, even if back elements differ from one another in depth coordinate (i.e., Z-axis coordinate), the amount that, when they are actually displayed on the screen, their associated right and left images are offset with respect to each other is not so great; thus, it is difficult for the viewer to recognize differences in depth among the elements.

As another example, the effect of seeing objects through air is needed when the interocular distance set by the depth distance reduce means 16 is small. The reason is that, when the interocular distance is set small, the amount that right-eye and left-eye images displayed on the display 1 are offset with respect to each other becomes smaller than with the case where the interocular distance is set large and hence it becomes difficult for the viewer to recognize the difference in depth among elements.

When the decision is that the effect of seeing objects through air is needed, the tone change means 17 changes the tone of the model so that the further away each model is from the viewpoint center O, the closer its tone gets to the background tone (step S115). When the decision is that the effect of seeing objects through air is not needed, the tone change means 17 keeps the model tone as it stands.

The effect of seeing objects through air may be furnished all the time or otherwise.

The tone of the model element thus changed (or kept) is sent to the model data manage means 19.

At the termination of the processing through step S115, the model data manage means 19 will have held the depth position in the stereoscopic coordinate system of the model that is to be displayed on the display screen, the size (including the shape) and tone of the model, and the interocular distance serving as a basis for calculation of the display positions of images of that model (right- and left-eye images) that are to be displayed on the display screen.

The model data manage means 19 then sends such data to the image data create means 20. In addition, the control means 10 reads data relating to graphical user interface components to be displayed on the display from the GUI data manage means 21 and passes them to the image data create means 20. The image data create means places the graphical user interface components on a plane parallel to the XY plane having the same Z-axis coordinate as the gaze point after being moved in the stereoscopic coordinate system by the model move means 14 or in the vicinity of that plane (step S116).

Based on the data, the image data create means 20 determines the display positions and display sizes of right- and left-eye images of each model element on the display screen 1a and moreover determines the positions in the stereoscopic coordinate system of the graphical user interface components to be displayed on the display (step S117).

Hereinafter, reference will be made to FIGS. 13A and 13B to describe the operation of the image data create means 20. First, description will be given of the case where an element E1 constituting a model is located in front of the display screen 1a in the stereoscopic coordinate system.

The line LL connecting the left eye 3a and the center CE1 of the element E1 is first set up and then the intersection CL1 of the line LL and the display screen 1a is obtained. This intersection CL1 is determined as the center position (display position) of the left-eye image IL1 of the element E1 displayed on the display screen 1a. The size of the left-eye image IL1 is determined so that the ratio of the distance between the left eye 3a and the element E1 to the distance between the left eye 3a and the intersect CR1 becomes equal to the ratio of the size of the element E1 to the size of the left-eye image IL1. On the basis of this determination, image data for the left eye is created. For the right-eye image IR1 as well, its center position CR1 and size are determined in the same way and then image data for the right eye is created.

Figure 13A:
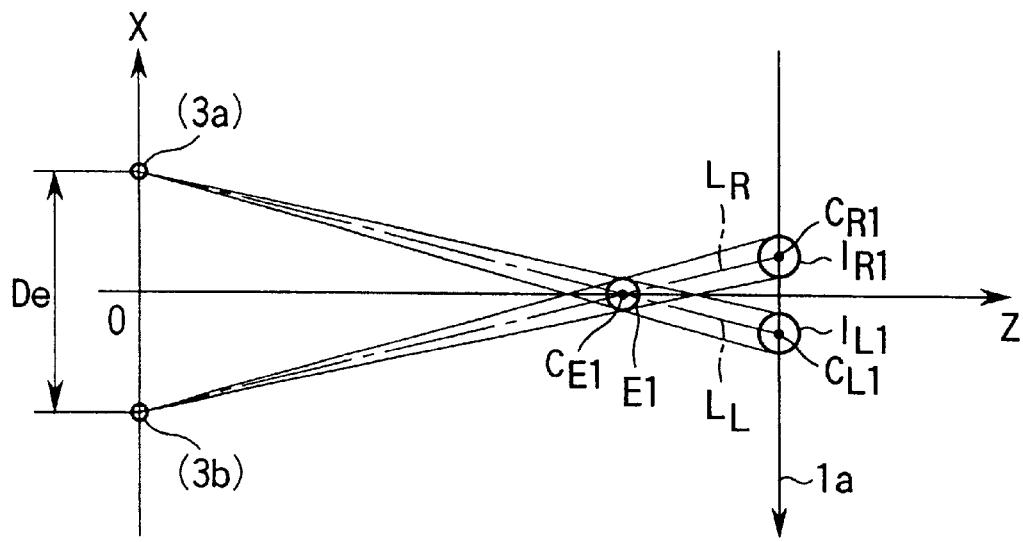
FIGS. 13A and 13B show the operation of the image data creating means.
Figure 13B:
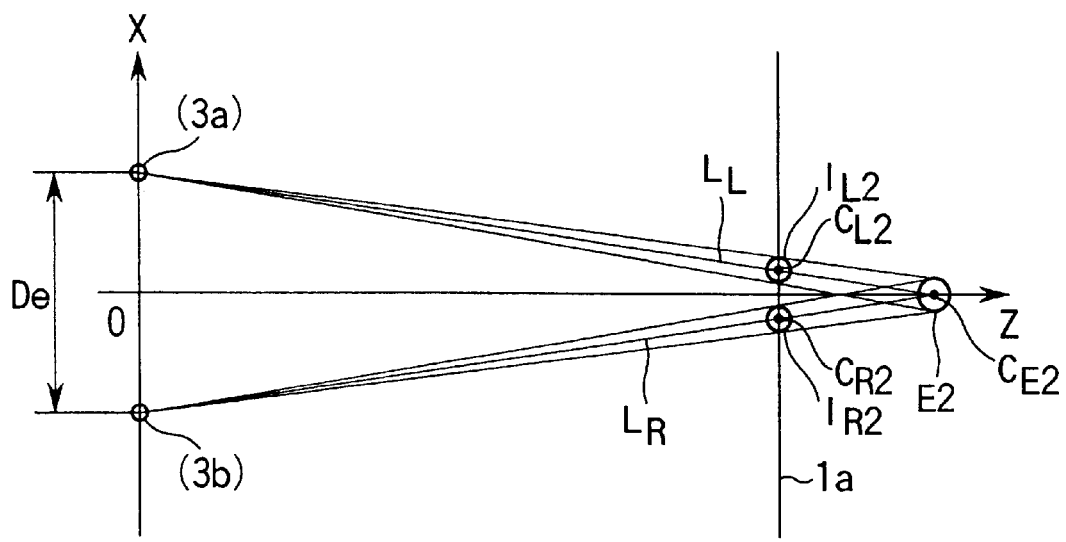

FIG. 13B shows the case where a model element E2 is located behind the display screen 1a in the stereoscopic coordinate system. In this case as well, the center position and size of each of the images for the left and right eyes are determined in the same way as described in conjunction with FIG. 13A.

The image data create means 20 also performs the same processing for graphical user interface components to determine the display position and size of each of the left- and right-eye images for each GUI component.

When the elements E1 and E2 are displayed simultaneously and, in step S115, the model's tone is changed by the tone change means 17 in such a way that the farther away from the viewpoint center, the closer the model tone gets to the background tone, the image data create means 20 creates image data such that the tone of left and right images IL2 and IR2 for the element E2 is closer to the background tone than that of left and right images IL1 and IR1 for the element E1.

Further, when the elements E1 and E2 are displayed simultaneously and the left and/or right image for the element E2 overlaps with the left and/or right image for the element E1, the image create means 20 adopts, on preferential basis, the image data for the element E1 that is present in front of the screen and deletes image data which, of image data for the element E2 that is present behind the screen, is associated with that portion of the element E2 which overlaps the image of the element E1.

The image data create means 20 then sends the left-eye image data and the right-eye image data to the display unit 1, which, in turn, displays images based on the image data (step S118).

Next, the control means 10 inquires of the viewer as to whether he or she will continue to use the stereoscopic system (step S103). When, for example, the viewer wants to display the model with its orientation changed, the process in step S104 and the subsequent processes are carried out.

As described above, according to the present embodiment, an image indicating a model can be automatically displayed under the optimum stereoscopic conditions. For this reason, a feeling of strangeness the viewer has for the displayed images and viewer's eye fatigue can be eased.

In the stereoscopic system according to this embodiment, to further ease the viewer's eye fatigue, the following approaches are taken. That is, the binocular fusing type stereoscopic system can impose constant strain on viewer's eyes in comparison with the normal two-dimensional display system. For this reason, to further ease the strain on the viewer, the system is provided, as shown in FIG. 1, with the offset adjust means 22 that adjusts the amount that right and left images are offset with respect to each other.

The offset adjust means 22 monitors image display time and, when a fixed period of time lapses after the start of display, issues an offset adjust instruction to the image data create means 20 via the model data manage means 19.

The stereoscopic effect depends on the amount that the right and left images are offset with respect to each other (the distance between CL1 and CR1 in FIG. 13A). The smaller the offset, the smaller the stereoscopic effect becomes and vice versa. When the offset is too great, it becomes impossible for viewers to fuse right and left images into one three-dimensional image, that is, stereoscopy itself becomes impossible.

Figure 18A:
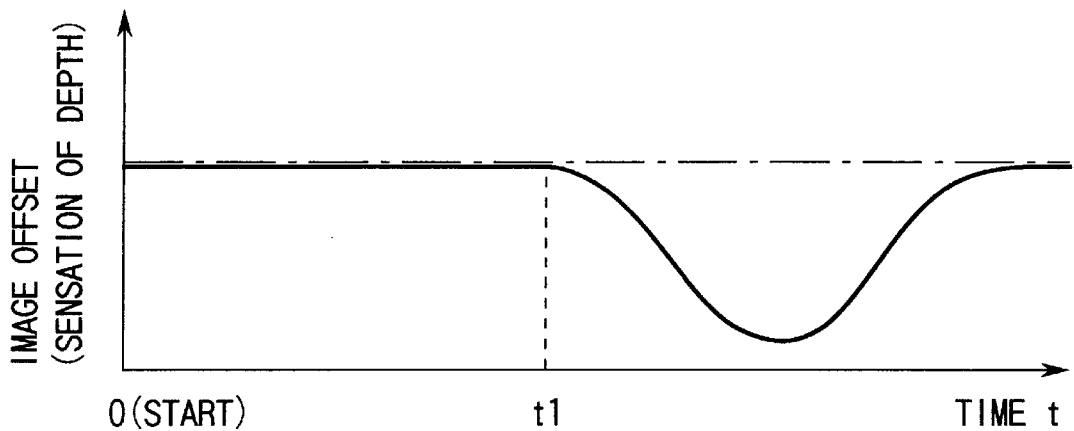
FIGS. 18A and 18B is a graph showing a process to relax the stereoscopic conditions with time in the first and second embodiments.
Figure 18B:
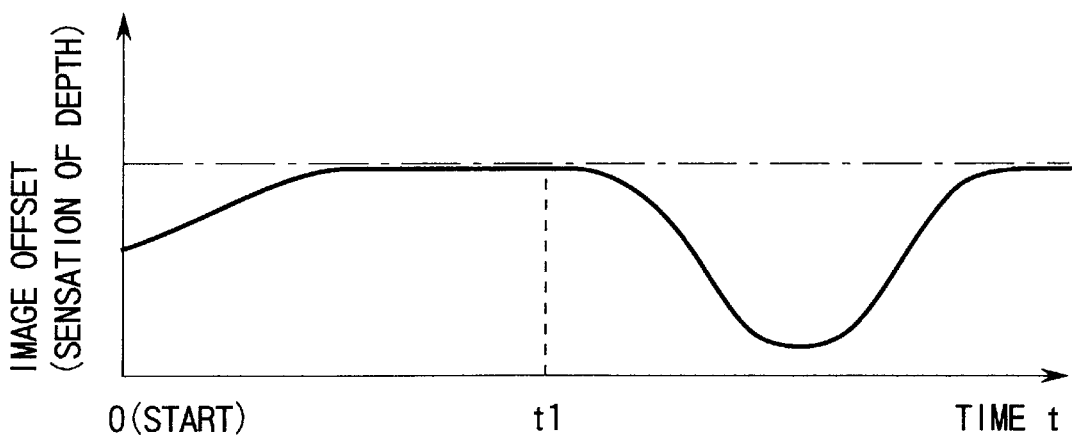

In the present embodiment, in response to that instruction the data create means 20 varies the offset amount as shown in FIGS. 18A and 18B with the distance between CL1 and CR1 in FIG. 13A and the distance between CL2 and CR2 in FIG. 13B as critical offset amounts.

That is, as shown in FIG. 18A, until a given period of time, t1 (for example, twenty minutes), lapses after the start of display, the offset amount corresponds to the critical offset amount and, after an elapse of t1, the data create means 20 varies slowly the offset amount with a given period to diminish the three-dimensional effect.

Such processing prevents viewer's watching images with an enhanced effect of three dimensions for a long time, allowing their eye fatigue to be eased.

Such processing as shown in FIG. 18B can also be performed. In this example, at the start of image display, the offset amount is set smaller than the critical value so as to diminish the three-dimensional effect, and the offset amount is then varied with time to approach the critical value.

That is, the stereoscopy is realized by viewer fusing right and left images into one image in the brain. It is therefore considered that since, at the start of view, the viewer is not accustomed to fusing, he or she will not be able to perform fusing well or great strain will be imposed on the eyes. This problem will be solved by performing the processing shown in FIG. 18B.

In the present embodiment, in determining the stereoscopic conditions, the entire model is moved on the coordinate system for the stereoscopic system (steps S109 and S110). As long as the movement alone fails to place the entire model in the easiness-of-stereoscopy region, the interocular distance is corrected to thereby reduce the space in the direction of depth (step S115), which provides stereoscopy with a sufficient effect of three dimensions in comparison with simply reducing the space in the direction of depth.

Hereinafter, reference will be made to FIGS. 14A, 14B, and 14C and FIGS. 15A and 15B to describe problems that arise from the preferential correction of interocular distance.

Figure 14A:
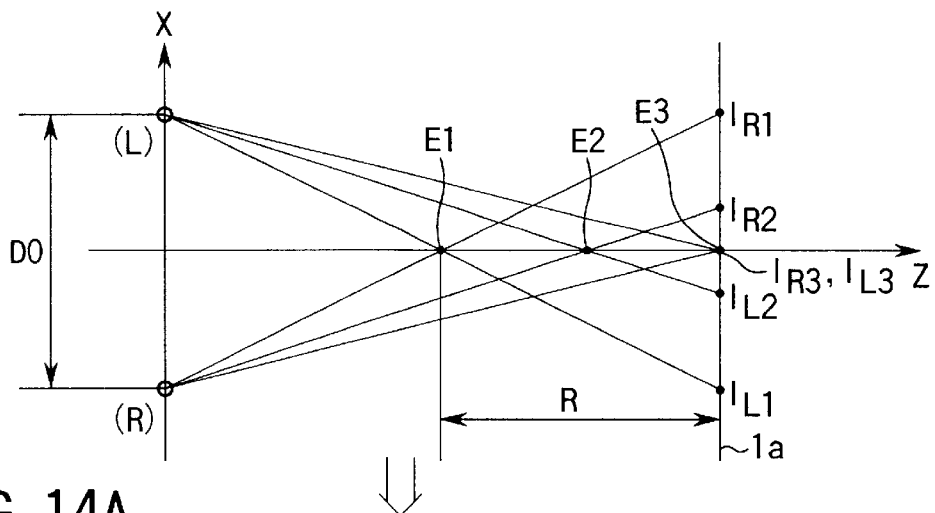
FIGS. 14A, 14B and 14C show the reduction of distance of depth when the interocular distance is corrected.
Figure 14B:
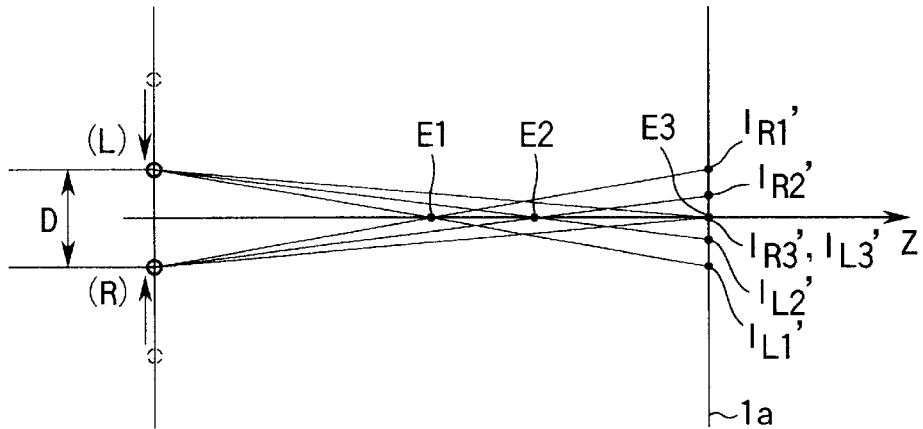
Figure 14C:
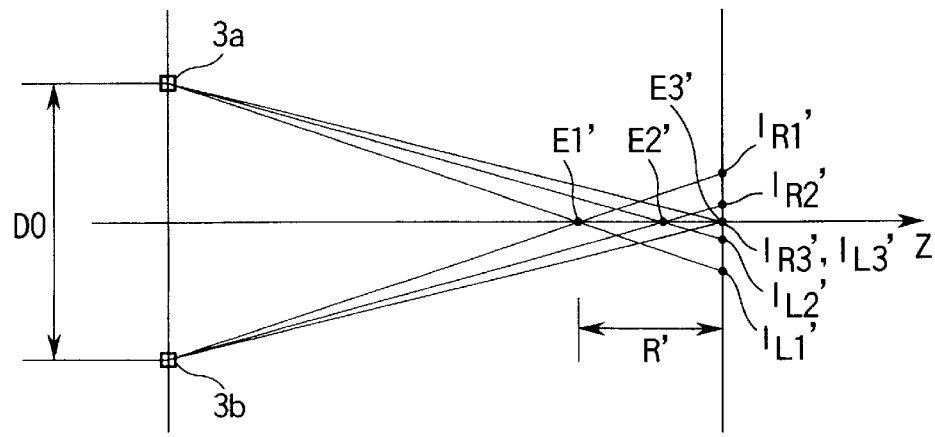

Suppose that, as shown in FIG. 14A, model elements E1, E2 and E3 are placed on the stereoscopic coordinate system. When the interocular distance is the initial value D0, left images IL1, IL2 and IL3 and right images IR1, IR2 and IR3 of the respective elements E1, E2 and E3 are displayed on the display screen 1a. Suppose here that the interocular distance is reduced from D0 to D as shown in FIG. 14B. Then, left images IL1', IL2' and IL3' and right images IR1', IR2' and IR3' of the respective the elements E1, E2 and E3 are displayed on the display screen 1a. An advantage with the way to change the interocular distance is that each image prior to change of the interocular distance and the corresponding image after change of the interocular distance are equal to each other in size.

The interocular distance correction is only performed in image processing; the viewer's actual interocular distance is not changed. For this reason, the viewer will perceive the elements E1, E3, and E3 as if they were placed in the positions E1', E2' and E3'. In this case, the viewer will perceive the elements E1, E2 and E3 as if the interval between each element were reduced considerably in the direction of depth.

Figure 15A:
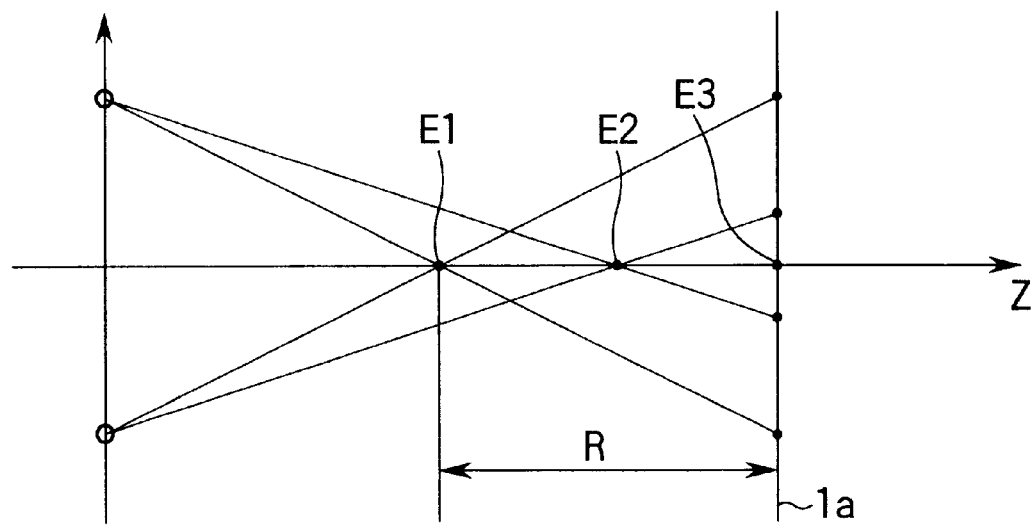
FIGS. 15A and 15B show the operation when the entire model is moved.
Figure 15B:
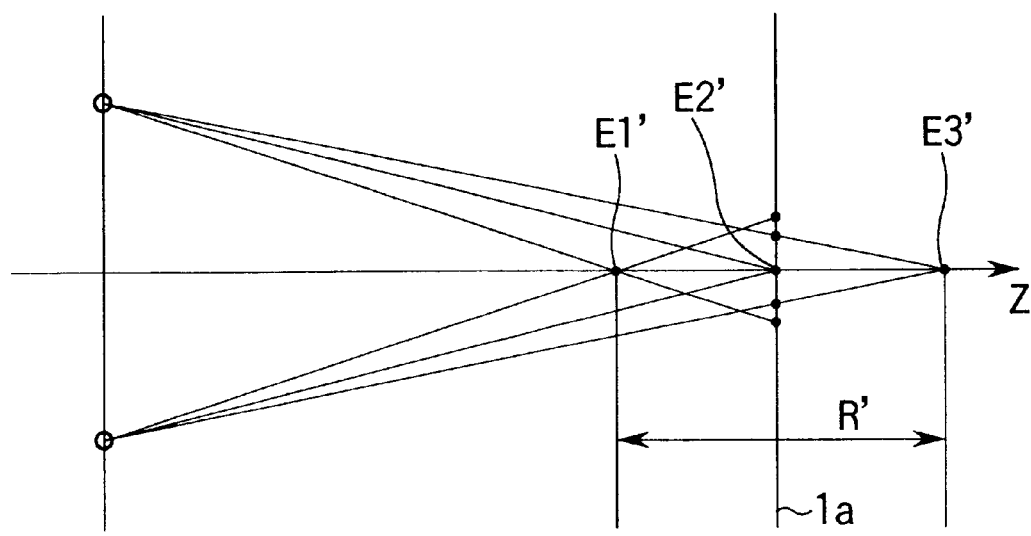

The present embodiment solves the above problems by performing the movement of the entire model on preferential basis. That is, as shown in FIG. 15B, the present embodiment moves the elements E1, E2 and E3 in the direction of depth on the stereoscopic coordinate system prior to the interocular distance correction. Thus, the positional relation among the elements E1, E2 and E3 that the viewer perceives will not vary as shown in FIGS. 15A and 15B. However, the movement of the entire model varies the size of the left and right images displayed on the display screen 1a. To compensate for variations in size, the size of each element is corrected according the distance over which it has been moved (step S111). In the present embodiment, the interocular correction is made only on that portion of a model for which only the movement of the entire model is insufficient to fit the model into the easiness-of-stereoscopy region. Thus, the loss of the sensation of depth for each model element can be reduced to a minimum.

In the right and left image fusing type stereoscopic system, in displaying a model that is situated at the edge of the screen before the screen, a certain point of the model may be displayed in only one of right and left images. In such a case, the viewer will perceive that the image of the model that is to be originally present before the screen is hidden by the screen that is to be present behind the image; thus, a discrepancy occurs in a forward and backward position relation.

There will be two solutions for that problem; the first is to set up all the display objects (model) behind the screen and the second is not to make the viewer conscious of the screen edges definitely. With the first method, the protrusion of displayed images is small, failing to obtain pictures of full power. For this reason, the system of this embodiment implements the second method by the screen edge processing section 23 shown in FIG. 1.

The screen edge processing section 23 receives model position data, model size data, and interocular distance data from the model data manage means 19. On the basis of these data, the screen edge processing section 23 detects whether the model is situated at the screen edge and determines whether the edge blurring or shading-off process is to be performed. In addition, the range of blurring of shading-off of the edges of right and left images is determined.

Based on these determinations, the screen edge processing section 23 changes the lightness of the model stepwise so that the closer to the edge, the darker, or changes the tone of the model so that the closer to the edge, the closer to the background tone.

This image data is sent to the image data create means 20 together with other data via the model data manage means 19 and processed in step S118.

Such processing makes the viewer somehow feel the screen edge invisible. Even in the presence of such a discrepancy as described above, therefore, the viewer will become unconscious of it.

Figure 16:
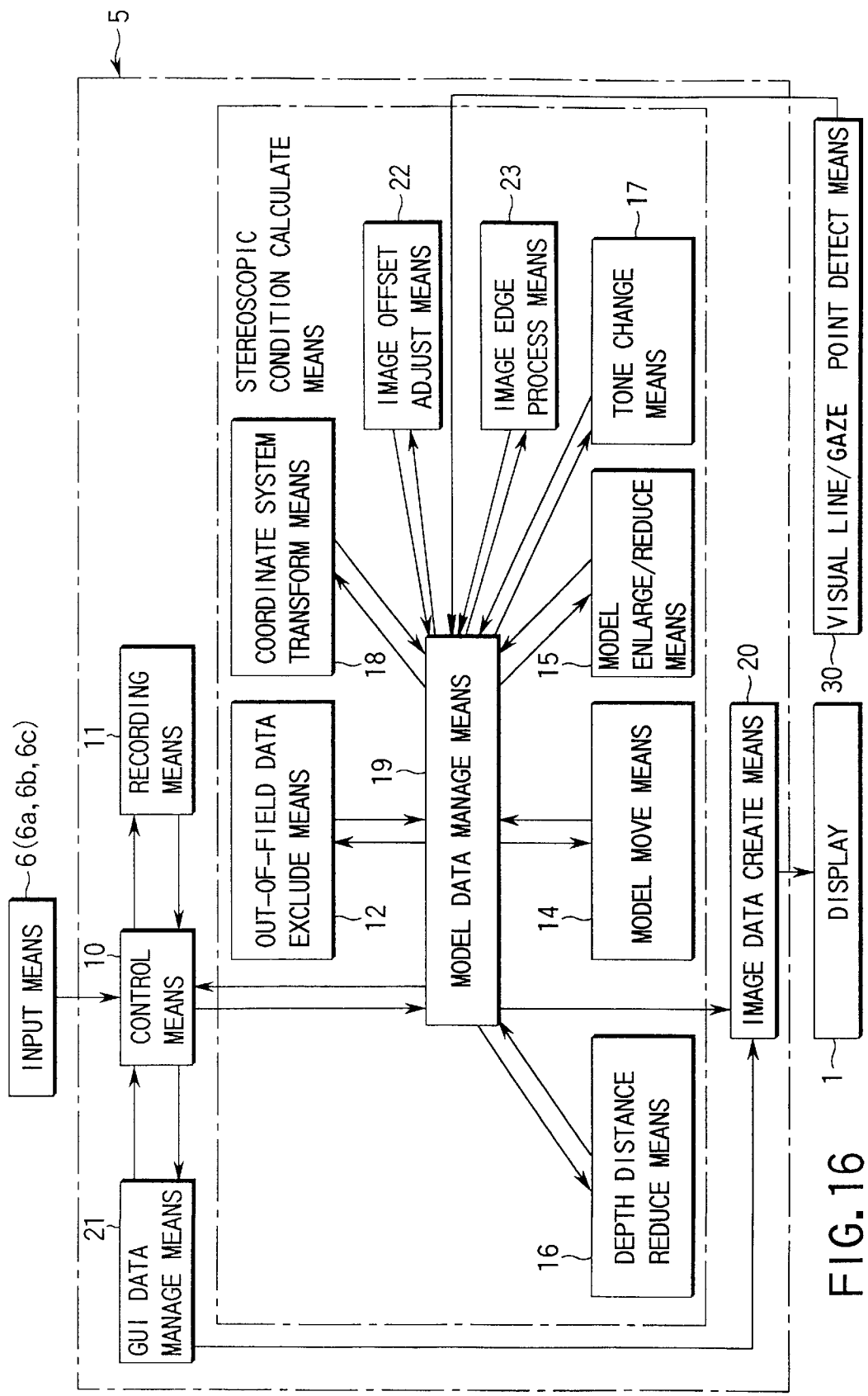
FIG. 16 is a block diagram of a stereoscopic display system according to a second embodiment of the present invention.

Next, a second embodiment of the present invention will be described with reference to FIGS. 16, 17A and 17B. As shown in FIG. 16, the second embodiment is distinct from the first embodiment only in that a visual-line/gaze range detect means 30 replaces the gaze range determination means 13 in the first embodiment and the stereoscopic condition calculation flow is changed accordingly. Thus, like reference numerals are used to denote corresponding components to those in the first embodiment and detailed descriptions thereof are omitted.

As shown in FIG. 16, the stereoscopic system is equipped with the visual-line/gaze range detect means 30 which detects actual visual lines and gaze point on displayed images. The means consists of a binocular gaze analyzer manufactured by Takei company as an example. This means is connected to the model data manage means 19 to send to it in real time information as to which area of the display screen la the viewer's eyes are fixed on. As the visual-line/gaze range detect means 30, use may be made of existing binocular gaze analyzers having the same function as the one manufactured by Takei company.

The operation of the embodiment thus arranged will be described with reference to FIGS. 17A and 17B.

Figure 17A:
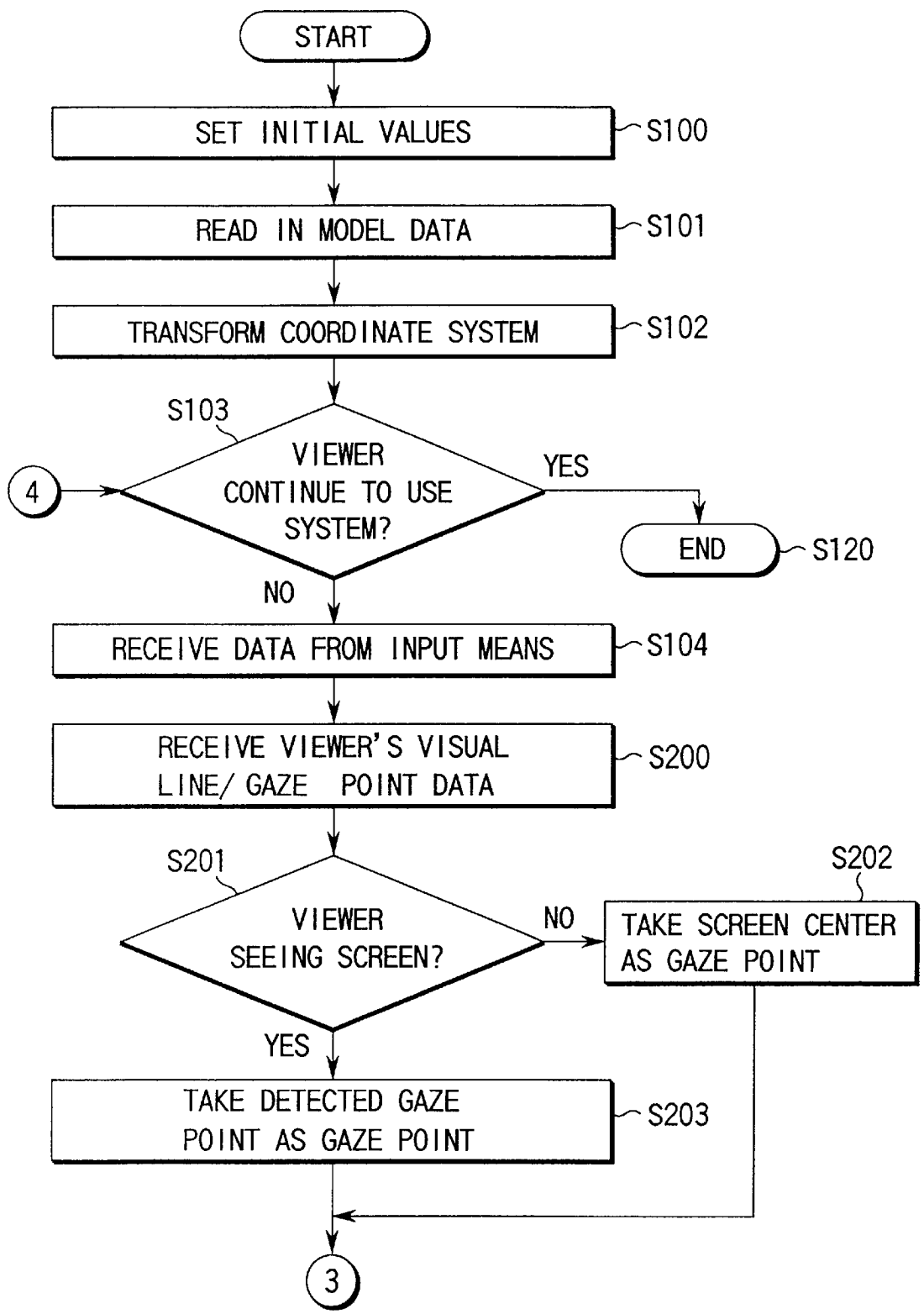
FIGS. 17A and 17B form a flowchart for the stereoscopic condition calculation processing in the second embodiment.
Figure 17B:
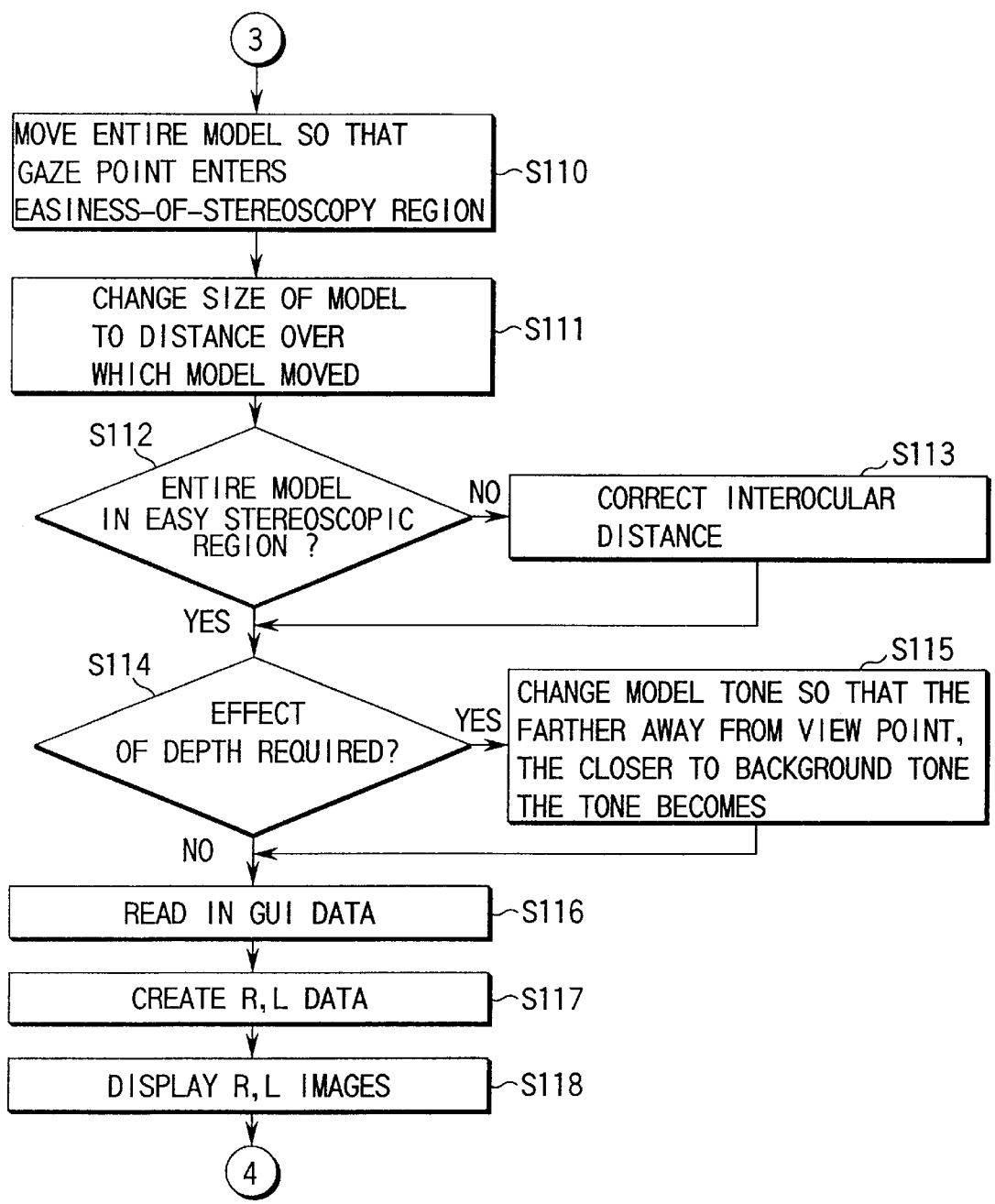

As in the first embodiment, steps S100 to S104 are carried out as shown in FIG. 17A.

Next, the model data manage means 19 receives light-of-sight and gaze point position data from the visual-line/gaze point detect means 30 (step S 200) and then makes a decision as to whether or not the viewer watches the screen from the detected direction of visual lines (step S201). When the viewer is not watching the display screen la, the center 1b of the screen is taken as the gaze point (step S202). When the viewer is watching the screen, on the other hand, the point on the screen at which the viewer's visual lines are fixed for the longest time is taken as the gaze point (step S203).

In this case, the gaze range in the depth direction can be determined as a range of standard deviation from gaze points, coordinate of Z-axis in the model.

As in the first embodiment, the processes in steps S110 to S115 are carried out next, so that the model data manage means 19 obtains data on the shape, size, placement and tone of the model in the stereoscopic coordinate system. The data are sent to the image data create means 20 to produce image data for right and left eyes (step S117). The display unit 1 displays images for the right and left eyes on the display screen 1a (step S118).

The control means 10 next inquires of the viewer as to whether he or she continues to use the stereoscopic system (step S103). When the viewer continues to use the system, the procedure is repeated starting with step S104.

As described above, according to the second embodiment, the visual-line/gaze range detect means 30 is provided which detects viewer's actual visual lines and gaze point, allowing the gaze range to be determined more accurately. For this reason, more proper stereoscopic conditions can be calculated.

In the first and second embodiment described above, the model move means 14 and the depth distance reduce means 16 function to put the gaze range or the entire model into the easiness-of-stereoscopy region shown in FIG. 9. This is not restrictive. They may function to put the gaze range or the entire model into the possibility-of-stereoscopy region.

Figure 19:
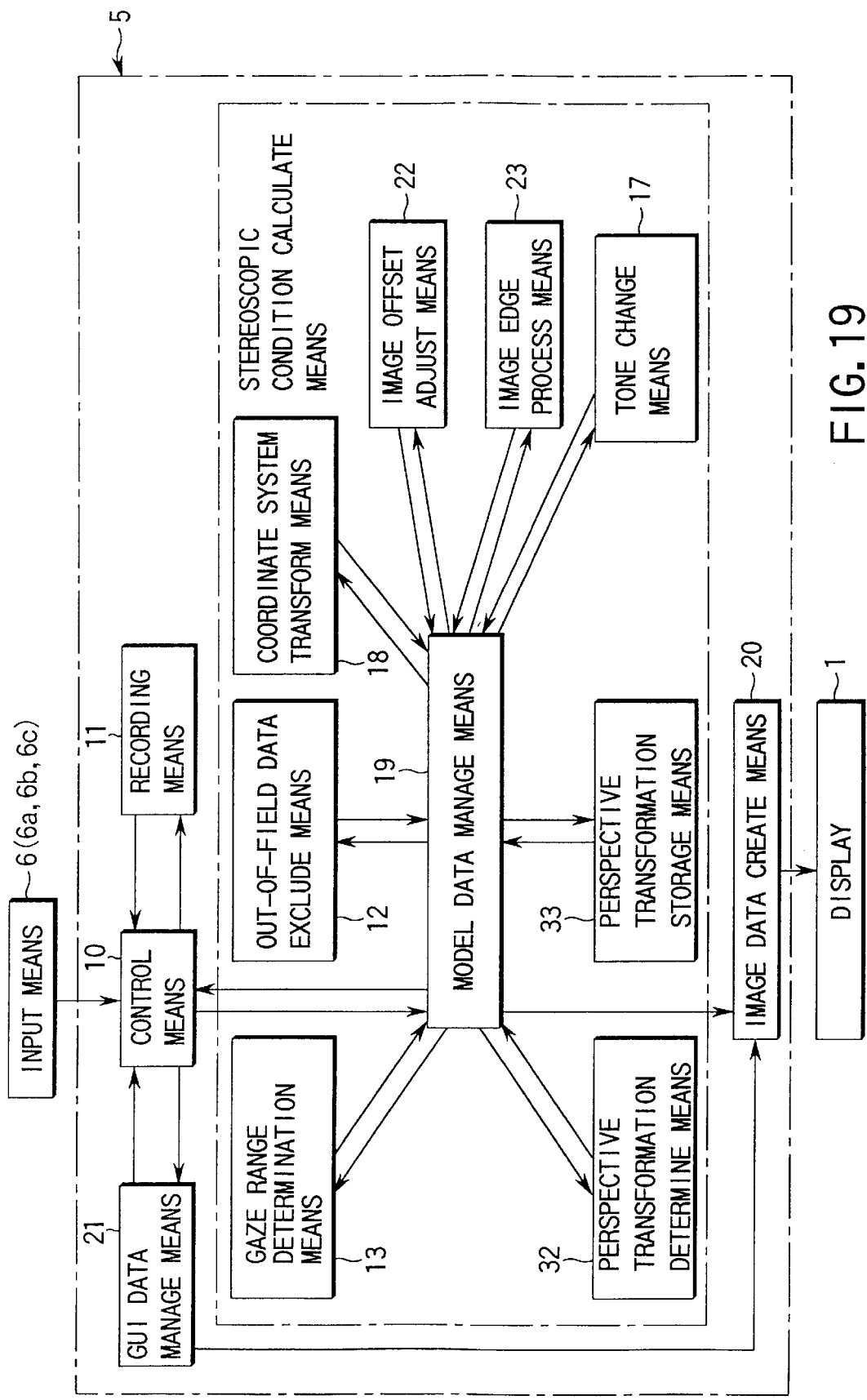
FIG. 19 is a block diagram of a stereoscopic display system according to a third embodiment of the present invention.

A third embodiment of the present invention will be described with reference to FIGS. 19, 20A, and 20B.

The first and second embodiments are arranged to move a model and enlarge or reduce it to cause an eye gaze range for that model to be positioned in the possibility-of-stereoscopy region, thereby allowing stereoscopy to be facilitated. In this embodiment, the same processing is performed by a perspective transformation method determined by a perspective transformation determining means 32 and stored in a perspective transformation storage means 33.

Hereinafter, the operation of the system will be described with reference to FIGS. 20A and 20B. Like reference numerals are used to denote corresponding components to those in the first embodiment and descriptions thereof are omitted.

The first and second embodiments take the processes of changing the position of a model, enlarging it, and changing the interocular distance in order to produce stereoscopic images. From a different point of view, the processes can be organized as a perspective transformation method for projecting a three-dimensional model onto a two-dimensional image.

Let the interocular distance be 2e, the viewpoint center be 0 (0, 0, 0) and the distance between the viewpoint center and the display screen be D. According to the perspective transformation, a point P(xp, yp, zp) in three-dimensional space is then projected onto:

Left-eye image:

(D·xp/Zp+e·(D/zp−1), D·yp/zp)

Right-eye image:

(D·xp/Zp−e (D/zp−1), D·yp/zp)

Thus, the use of the perspective transformation allows the same processing to be performed without moving and enlarging/reducing a three-dimensional model as in the first embodiment.

Figure 20A:
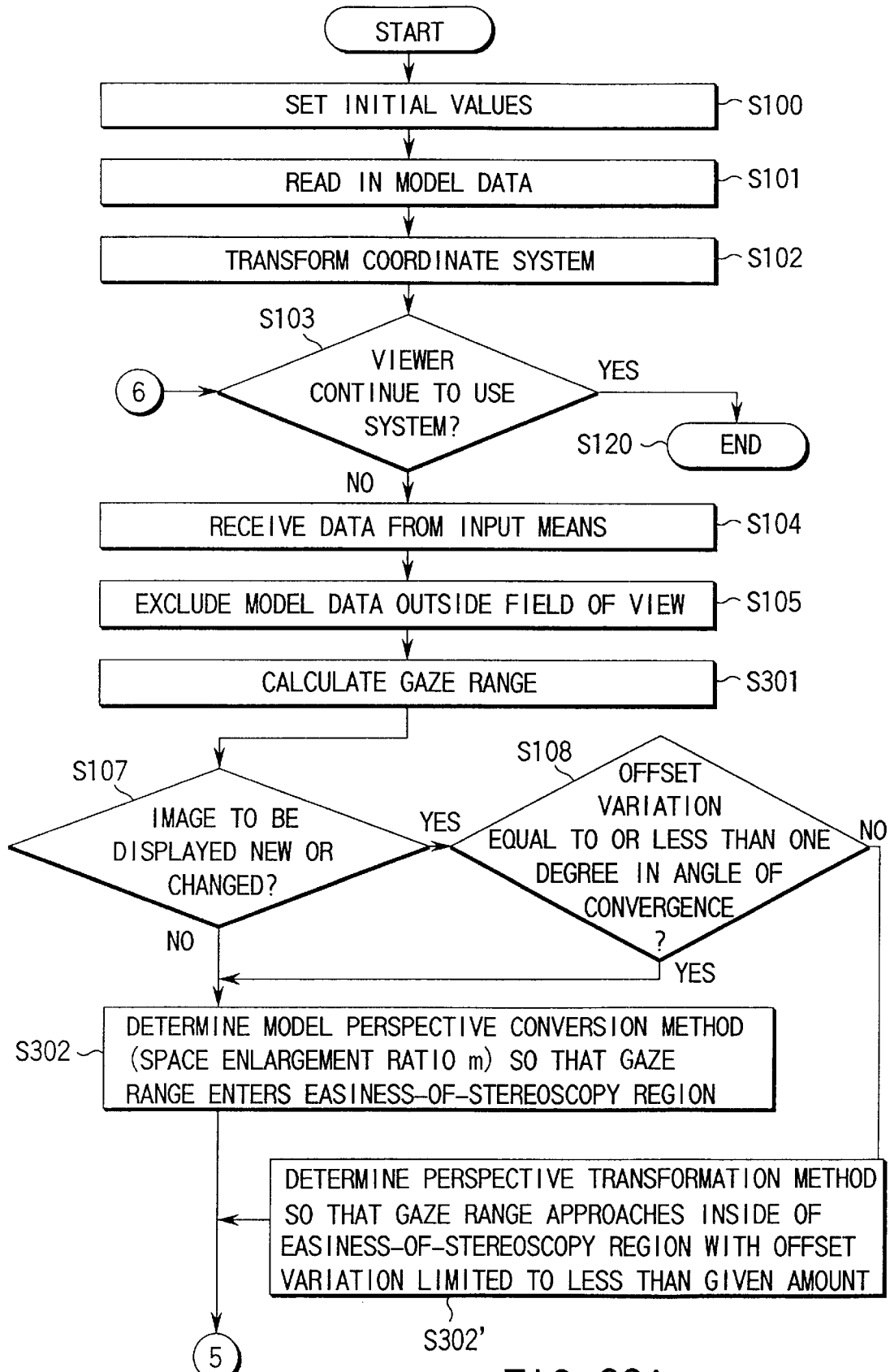
FIGS. 20A and 20B form a flowchart for the stereoscopic condition calculation processing in the third embodiment.
Figure 20B:
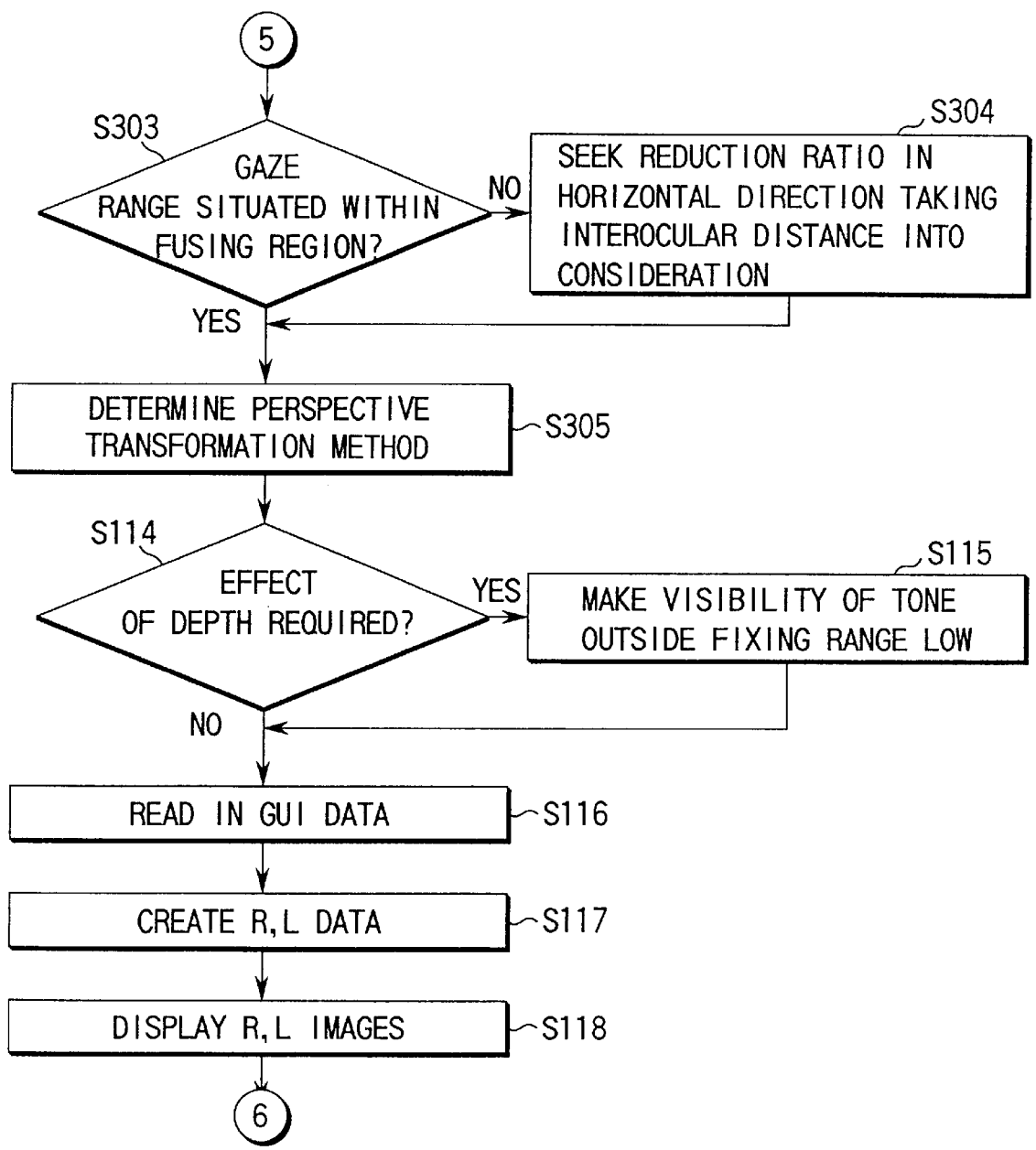

That is, in this system, a gaze range is obtained in step S301 of FIG. 20A in the same way as described above and, in subsequent step S302, an enlargement ratio m (corresponding to a perspective transformation method) for space centered at the viewpoint center is determined from the original position of the model and the distance required to move the model into the gaze range.

By enlarging or reducing the whole space in which the model is situated by the space enlargement ratio m, the size of the model is increased or decreased by a factor of m and a point P in the model is shifted to a point P' (m xp, m yp, m zp).

In subsequent step S303, a decision is made as to whether each point in the model after perspective transformation is in the easiness-of-stereoscopy region. That is, a point N' to which a representative point P that is nearest to the viewpoint center has been shifted and a point M' to which a representative point M that is farthest from the viewpoint center has been A shifted are calculated and the above decision is made for those points.

When the decision is that the points are not in the easiness-of-stereoscopy region, the interocular distance is adjusted in the same way as described in conjunction with FIG. 10 to compress the space in the direction of depth so that all the points become positioned in the easiness-of-stereoscopy region. Assuming here that the reduction ratio for the interocular distance is t, that point P in the three-dimensional space is, in the ultimate analysis, projected onto:

Left-eye image:

(D·xp/Zp+e·t·(D/(m·zp)−1, D·yp/zp)

Right image:

(D·p/Zp−e·t·(D/(m·zp)−1), D·yp/zp)

Thus, the perspective transformation method can be defined by the model enlargement ratio m in relation to the viewpoint center, the original interocular distance 2e, the distance D between the viewpoint center and the display screen, and the interocular distance reduction ratio t obtained from FIG. 10 (step S305).

Those data (perspective transformation method) are preserved in the perspective transformation storage means 33 and employed by the image data create means 20 for subsequent image data creation (steps S116, S117 and S118). In this manner, image data that allows stereoscopy to be facilitated can be created as in the first and second embodiments.

In this example, the perspective transformation method is stored in the perspective transformation storage means 33. This is not restrictive. A storage medium, such as a DVD, may be used to store a perspective transformation method for each scene obtained in advance by the system of the present embodiment together with the model position within the field of view seen from viewpoints.

That is, by setting in the storage medium the interocular distance, the distance between the viewpoint center and the display screen, the model data prior to processing, the position of the model seen from the viewpoint center, the model enlargement ratio, m, and the interocular distance reduction ratio, t, for each scene, the image data create means 20 can produce images that are easy to view stereoscopically without the use of the stereoscopy facilitating condition calculating section.

Figure 21:
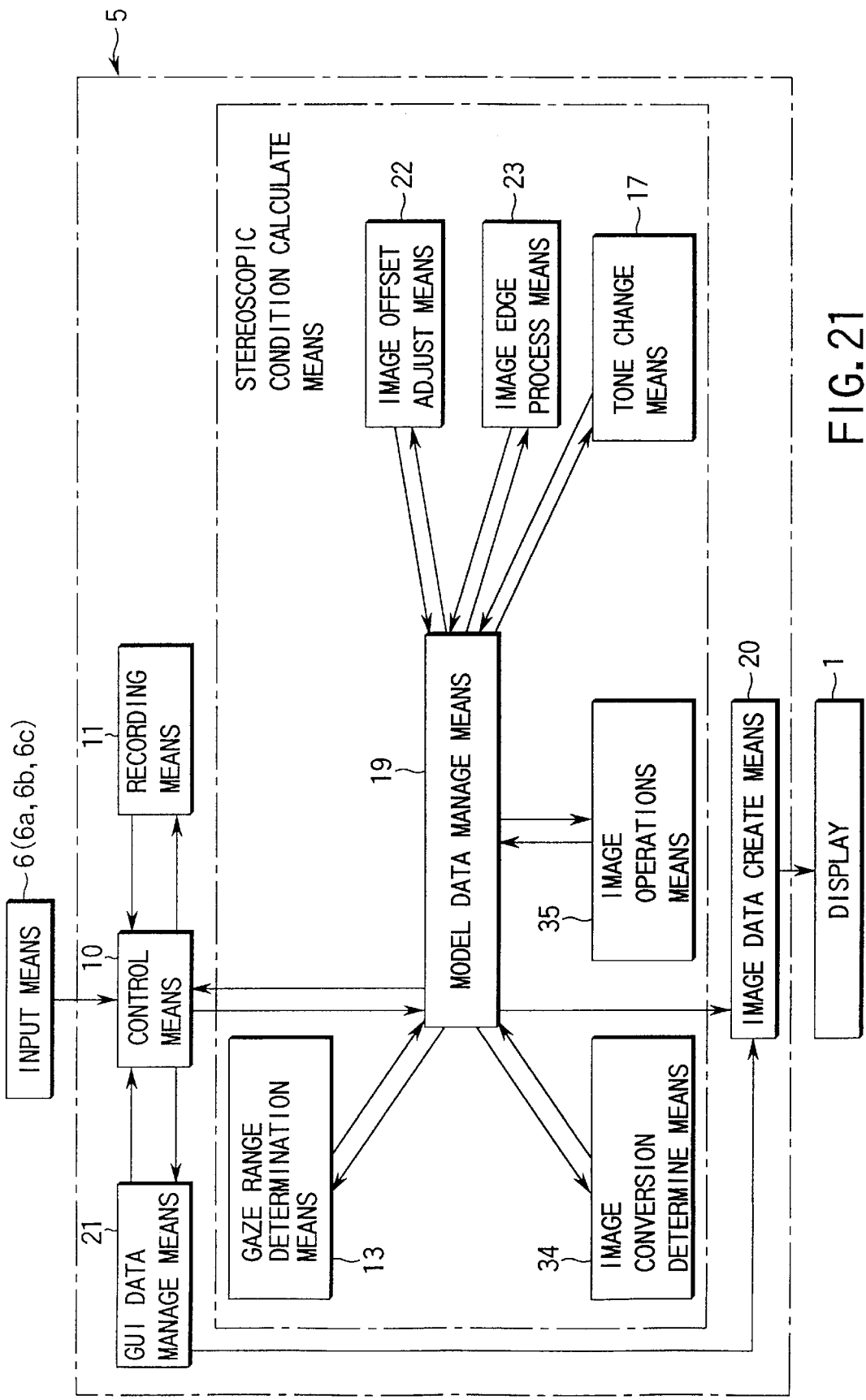
FIG. 21 is a block diagram of a stereoscopic display system according to a fourth embodiment of the present invention.
Figure 22A:
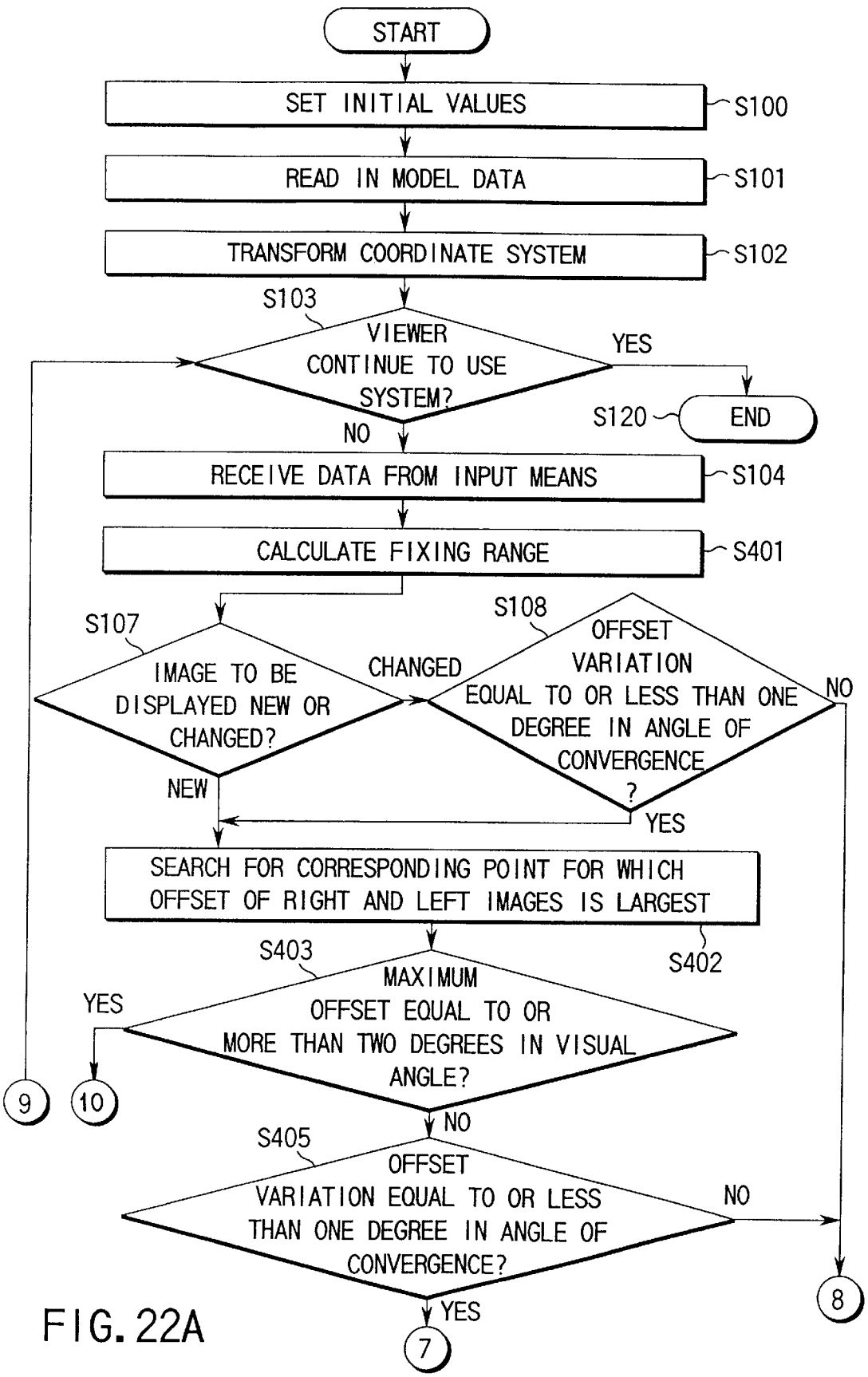
FIGS. 22A and 22B form a flowchart for the stereoscopic condition calculation processing in the fourth embodiment.
Figure 22B:
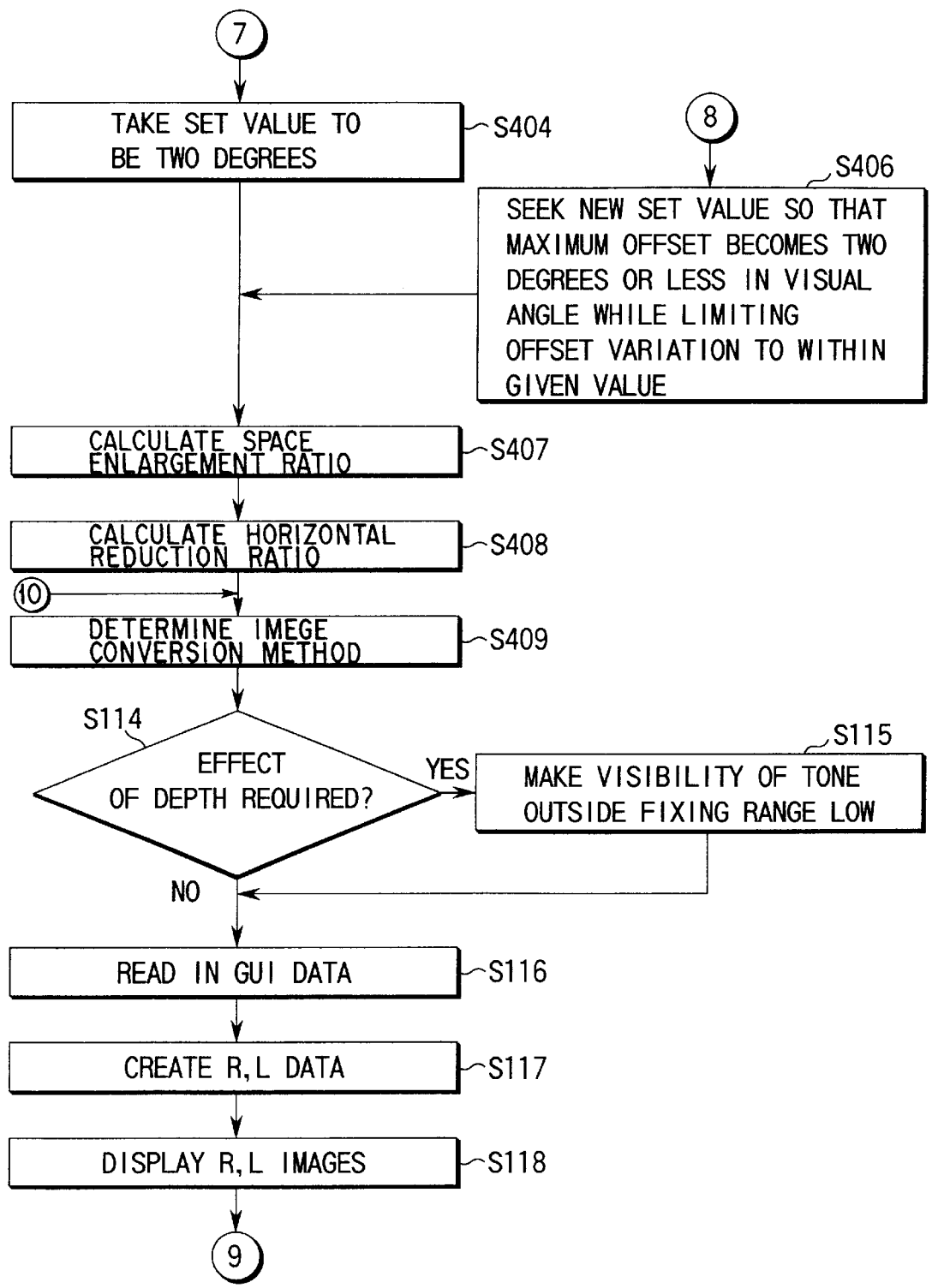

A fourth embodiment of the present invention will be described below with reference to FIGS. 21, 22A and 22B. In these figures, like reference numerals are used to denote corresponding components to those in the first embodiment and descriptions thereof are omitted.

The first, second and third embodiments are each directed to a system which displays a three-dimensional model given by information in the form of shape, size, position of placement, and so on so that it can easily be viewed stereoscopically. On the other hand, the fourth embodiment is directed to a system which displays actually shot pictures, such as motion pictures and photographs, in a form that they are easy to view stereoscopically.

In such a case, whether the stereoscopy is easy depends on the positional relationship between gaze ranges in left and right images. For this reason, the system of the fourth embodiment is equipped, as shown in FIG. 21, with an image conversion determination means 34 which determines a conversion method for converting image data to image data that are easy to view stereoscopically and an image operations means 35 for obtaining converted image data in accordance with the image conversion method determined.

The process flow in this system will be described with reference to FIGS. 22A and 22B. In this figure, like reference numerals are used to denote corresponding steps to those in the first embodiment and descriptions thereof are omitted.

The system uses two parallactic images, such as an image shot with a right-eye camera and an image shot with a left-eye camera. The image data are sent to the eye gaze range determination means 13 to determine the gaze range using either of the images (step S401).

To determine the gaze area, a method is taken which obtains the center of gravity of pixels weighted by tones and the standard deviation σ of distance from the center of gravity and determines a circle with a radius of 2 σ from the center of gravity as the gaze area. Assuming the coordinates of each pixel to be (xi, yi), the center of gravity (xG, yG) and the standard deviation σ are represented by equations (7) and (8)

$$\begin{cases} X_G = \dfrac{\sum_{i=0}^{N} W_i X_i}{\sum_{i=0}^{N} W_i} \\ Y_G = \dfrac{\sum_{i=0}^{N} W_i Y_i}{\sum_{i=0}^{N} W_i} \end{cases} \quad (7)$$

$$\sigma = \sqrt{\dfrac{\sum_{i=0}^{N} \{(X_i - X_G)^2 + (Y_i - Y_G)^2\}}{N}} \quad (8)$$

An alternative method is to detect corresponding image areas in the right and left images, seek three-dimensional coordinates from the correspondence between the image areas, and determine the gaze range in the direction of depth as with the model in the first, second and third embodiments.

To find corresponding points in the image areas, there is a method which emphasizes the edges of both the images and seeks points having a high level of correlation (see "multi-stage stereoscopic method that prioritizes correspondence of high reliability" by Yamaguchi et al, The Institute of Electronics, Information and Communication Engineers Paper D-11, Vol.J 74-D-11, No. 7).

Next, in step S402, a search is made under the following two conditions for a corresponding point for which, of corresponding points in other areas than the background within the determined gaze area, the amount that the right and left images are offset with respect to each other is largest.

That is, when the coordinate origin is taken on the left side of the display screen, the X-axis coordinate of one point (corresponding point) in the left image is taken as XL and the X-axis coordinate of that point in the right image is taken as XR. As the first condition, a search is made of points for which XL>XR for a point S for which XL−XR is at maximum.

At the point S, the left image is larger in X-axis coordinate than the right image. That is, the point S is recognized as a point which, like E1 shown in FIG. 13A, is situated before the screen. Of such points, the point S for which the amount that the right and left images are offset with respect to each other is largest is recognized as being situated nearest to the viewer within the gaze range.

Next, as the second condition, a search is made of points for which Xr>Xl for a point T for which Xr−Xl is at maximum. The point T is recognized as being situated behind the screen within the gaze range as shown in FIG. 13B at E2. Of such points, the point T is recognized as being situated farthest from the viewer within the gaze range because the amount that the right and left images are offset with respect to each other is largest for T.

Assume here that the position of the point S in the left image is (Xpl, Yp) and the position in the right image is (Xpr, Yp), and for point S the amount that the left image and the right image are offset with respect to each other, i.e., Xpl−Xpr, is dXp. Assume that, for the point T, the position in the left image is (Xql, Yq) and the position in the right image is (Xqr, Yq), and the amount that the left image and the right image are offset with respect to each other, i.e., Xqr−Xql, is dXq.

In the following, consider, as an example, the case where dXp>dXq, that is, the case where the offset amount for point S is larger than that for point T. A decision is made as to whether the point S lies within the easiness-of-stereoscopic range. In this embodiment, this decision is made in step S404 using an visual angle.

In this case, the maximum image offset within the gaze range corresponds to dxp for point S. A decision is made as to whether the offset exceeds two degrees in terms of visual angle. The reason is that, as described above, the easiness of stereoscopy is lost when the amount that the left and right images are offset with respect to each other is two degrees or more in terms of visual angle.

When, in step S403, the offset amount is less than two degrees in terms of visual angle, it is not particularly required to change image data. Thus, this offset amount in terms of visual angle is used as a set value. When the offset amount is two degrees or more, however, the set value is taken to be just two degrees in step S404.

In this case, it is also required to take a variation in the offset into consideration. The reason is that, as described above, the stereoscopy becomes difficult when a variation in the offset becomes one degree or more in terms of angle of convergence.

In step S405, therefore, the set value is determined such that the variation is less than one degree when the variation is one degree or more. In this case, the set value for the visual angle is taken to be not just two degrees but a value such that the variation is maintained at one degree (step S406).

The visual angle (set value) is determined from the distance D between the viewpoint center and the display screen. That is, the approximate distance (L) on the screen for a visual angle of two degrees will be $$L = 2 \times D \times \tan(\pi/180)$$
$$= \pi \times D / 90$$
$$= 0.035 \times D$$

In subsequent step S407, the space enlargement ratio m is determined using this set value. Here, assuming that the interocular distance is 2e and the set value for visual angle is two degrees, the space enlargement ratio m is defined by $$m=(dxp+2\times e)/(L+2\times e)$$

When the image is enlarged or reduced by a factor of the space enlargement ratio, the entire gaze range may not fall within the easiness-of-stereoscopy region. In this case, in step S 408, the reduction ratio t in the horizontal direction is obtained using the offset amount dXq for the point S.

That is, the reduction ratio t will be:

When (dxq+2×e)/m−2e≦0.035 D, t=1.0

When (dxq+2×e)/m−2e>0.035 D, t=0.035 ×m×D/(dxq+ 2e−2em)

When the space enlargement ratio and the horizontal reduction ratio t have been obtained in this manner, an image operations method is determined in step S409.

According to the image operations method of the embodiment, any corresponding points (xal, y), (xar, y) on the left and right images are transformed into:

left image:
(Xal+Xar)/2+e×t×((Xal−Xar+2×e)/(2×m×e)−1)
right image:
(Xal+Xar)/2−e×t×((Xal−Xar+2×e)/(2×m×e)−1)

The image operations means 35 converts image data with each scene, and the image data create means 20 produces stereoscopic images. Thus, as with the first, second and third embodiments, such a system can produce image data that allow easy stereoscopy even for actually shot images.

In this example, image conversion is performed with each scene by the image operations means 35. By storing on a storage medium, such as a DVD, image data that have been subjected to image conversion in advance by the stereoscopic condition calculation section of this system, the image data create means 20 can produce images that provide easy stereoscopy without the use of the stereoscopic condition calculation section.

The system of the fourth embodiment is effective in producing stereoscopic images easy to view on the basis of pictures shot by two cameras from different viewpoints.

Further, the system is also applicable to a system which produces a time difference from a moving image for stereoscopy. Moreover, the present invention is also applicable to binocular stereoscopic systems other than the time-multiplexing stereoscopic system.

As described above, according to the present invention, images representing a model placed in three-dimensional space can be automatically displayed on a display unit under optimum stereoscopic conditions. For this reason, it is possible to diminish the viewer's feeling of strangeness for images and eye fatigue.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stereoscopic display system for displaying a model stereoscopically using a pair of images seen from two different viewpoints, comprising:

gaze range determining means for determining a gaze range over which a viewer's right and left eyes are likely to be fixed on a model displayed from model data in a stereoscopic coordinate system;

model move means for moving the model in a direction of depth with respect to a display screen to bring the gaze range determined by the gaze range determining means, in an easiness-of-stereoscopy region in which stereoscopy is easy by changing data of the model;

model enlargement/reduction means for adjusting the inputted image data of the model to enlarge/reduce a size of the model moved by the model move means according to a distance over which the model is moved, to make an imaginary size of the model on the viewer's retina remain unchanged before and after the movement of the model;

determining means for determining whether the model subjected to enlargement or reduction by the model enlargement/reduction means is placed within the easiness-of-stereoscopy region;

interocular distance setting means for correcting an interocular distance when it is determined by the determining means that at least some of the model is outside the easiness-of-stereoscopy region to allow the model to fit into the easiness-of-stereoscopy region: and image data creating means for creating image data to be displayed on the display according to data obtained by the model move means, the model enlargement/ reduction means and the interocular distance setting means.

2. The system according to claim 1, wherein the gaze range determining means has a means for estimating a gaze range for both eyes by taking into consideration at least one of placement condition, tone, brightness, saturation, size, complexity and moving speed of the model seen from a viewpoint of a viewer.

3. The system according to claim 1, wherein the model move means includes depth distance reducing means for setting a scale in the direction of depth seen from the viewer so that at least the major part of a model moved by the model move means comes in the region in which stereoscopy is easy.

4. The system according to claim 1, further comprising out-of-field data removing means for removing data of a model existing out of field of view of a viewer.

5. The system according to claim 1, further comprising a visual-line/gaze range detecting means for detecting viewer's visual line and gaze range with respect to an image actually displayed, wherein the model move means moves the model in the direction of depth with respect to the display according to a gaze range detected by the visual-line/gaze range detecting means.

6. The stereoscopic display system according to claim 4, further comprising a visual-line/gaze range detecting means for detecting viewer's visual line and gaze range with respect to an image actually displayed, wherein the out-of-field removing means calculates a field of view of a viewer on the basis of a visual line detected by the visual-line/gaze range detecting means and removes data existing out of the field of the viewer.

7. The system according to claim 1, further comprising a tone changing means for changing a tone of a displayed model so that the further away from the viewpoint, the closer the tone becomes a background tone.

8. The system according to claim 1, wherein the model move means includes a means for, when a change occurs in the placement condition of the model seen from the viewpoint and the model move means moves the model according to the change, preventing an amount of moving of the model within the gaze range from exceeding about one degree in terms of angle of convergence for a predetermined period of time after the change in the placement condition occurs.

9. The system according to claim 1, wherein the image data creating means has a function of determining stereoscopic condition of graphic user interface items to be displayed on the display screen.

10. The system according to claim 1, further comprising means for varying a stereoscopic condition to diminish the stereoscopic effect.

11. The system according to claim 1, further comprising means for shading-off/blurring the edges of right and left image of the model, where the model is situated at the edge of the display screen.

12. A stereoscopic method for displaying a pair of picture images seen from two different viewpoints with respect to a model on a display screen stereoscopically, comprising:
a gaze range determining step for determining a gaze range over which a viewer's right and left eyes are likely to be fixed on a model displayed from model data in a stereoscopic coordinate system;
a model moving step for moving the model in a direction of depth with respect to a display screen to bring the gaze range determined by the gaze range determining step in an easiness-of-stereoscopy region in which stereoscopy is easy by changing data of the model;
a model enlarging/reducing step for adjusting the inputted image data of the model to enlarge/reduce a size of the model moved by the model moving step according to a distance over which the model is moved, to make an imaginary size of the model on the viewer's retina remain unchanged before and after the movement of the model;
a determining step for determining whether the model subjected to enlargement or reduction by the model enlargement/reduction means is placed within the easiness-of-stereoscopy region;
an interocular distance setting step for correcting an interocular distance when it is determined by the determining means that at least some of the model is outside the easiness-of-stereoscopy region, to allow the model to fit into the easiness-of-stereoscopy region: and a data creating step for creating image data to be displayed on the display according to data obtained by the model move steps he model enlargement/reduction step, and the interocular distance setting step.

13. The method according to claim 12, wherein the gaze range determining step has a step for estimating a gaze range for both eyes by taking into consideration a least one of placement condition, tone, brightness, saturation, size, complexity and moving speed of the model seen from a viewpoint of a viewer.

14. The method according to claim 12, wherein the model moving step includes depth distance reducing step for setting a scale in the direction of depth seen from the viewer so that at least the major part of a model by the model moving step comes in the region in which stereoscopy is easy.

15. The method according to claim 12, further comprising an out-of-filed data removing step for removing data of a model existing out of field of view of a viewer.

16. The method according to claim 15, further comprising a visual-line/gaze range detecting step for detecting viewer's visual line and gaze range with respect to an image actually displayed, wherein the out-of-field removing step calculates a field of view of a viewer on the basis of a visual line detected by the visual-line/gaze range detecting step and removes data existing out of the field of the viewer.

17. The method according to claim 12, further comprising a visual-line/gaze range detecting step for detecting viewer's visual line and gaze range with respect to an image actually displayed, wherein the model moving step moves the model in a direction perpendicular to the display according to a gaze range detected by the visual-line/gaze range detecting step.

18. The method according to claim 12, further comprising a tone changing step for changing a tone of a displayed model so that the further away from the viewpoint, the closer the tone becomes a background tone.

19. The method according to claim 12, wherein the model moving step includes a step for, when a change occurs in the placement condition of the model seen from the viewpoint and the model moving step moves the model according to the change, preventing an amount of moving of the model within the gaze range from exceeding about one degree in terms of angle of convergence for a predetermined period of time after the change in the placement condition occurs.

20. The method according to claim 12, wherein the image data creating step has a step of determining stereoscopic condition of graphic user interface items to be displayed on the display screen.

21. The method according to claim 12, further comprising a step of varying a stereoscopic condition to diminish the stereoscopic effect.

22. The method according to claim 12, further comprising a step of shading-off/blurring the edges of right and left image of the model, where the model is situated at the edge of the display screen.

23. A storage medium for storing computer programs for displaying a pair of picture images seen from two different viewpoints with respect to a model on a display screen stereoscopically in a computer system, comprising:
a gaze range determining instruction means for giving instructions for determining a gaze range over which a viewer's right and left eyes are likely to be fixed on a model displayed from model data in a stereoscopic coordinate system;
a model moving instruction means for giving instructions for moving the model in a direction of depth with respect to a display screen to bring the gaze range determined according to the gaze range determining instruction means in an easiness-of stereoscopy region in which stereoscopy is easy by changing data of the model to the computer system;
a model enlarging/reducing instruction means adjusting the inputted image data of the model to enlarge/reduce for giving instructions for a size of the model moved according to the model move instruction means according to a distance over which the model is moved to the computer system, to make an imaginary size of the model on the viewer's retina remain unchanged before and after the movement of the model;
a determining instruction means for giving instructions for determining whether the model subjected to enlargement or reduction by the model enlargement/ reduction means is placed within the easiness-of-stereoscopy region;

an interocular distance setting instruction means for giving instructions for correcting an interocular distance when it is determined according to the determining instruction means that at least some of the model is outside the easiness-of-stereoscopy region, to allow the model to fit into the easiness-of-stereoscopy region; and an image data creating instruction means for giving instructions for creating image data to be displayed on the display according to data obtained according to the model move instruction means, the model enlargement/reduction instruction means, and interocular distance setting instruction means, to the computer system.

24. The storage medium according to claim 23, wherein the gaze range determining instruction means has a means for giving instructions for estimating a gaze range for both eyes by taking into consideration all or part of placement condition, tone, brightness, saturation, size, complexity and moving speed of the model seen from a viewpoint of a viewer to the computer system.

25. The storage medium according to claim 23, wherein the model moving instruction means includes depth distance setting instruction means for giving instructions for setting a scale in the direction of depth seen from the viewer so that at least the major part of a model moved according to an instruction of the model moving instruction means comes in the region in which stereoscopy is easy to the computer system.

26. The storage medium according to claim 23, further comprising out-of-field data removing instruction means for giving instructions for removing data of a model existing out of field of view of a viewer to the computer system.

27. The storage medium according to claim 26, further comprising a visual-line/gaze range detecting instruction means for giving instructions for detecting viewer's visual line and gaze range with respect to an image actually displayed to the computer system, wherein the out-of-field removing instruction means gives instructions for calculating a field of view on the basis of a visual line detected by an instruction of the visual-line/gaze range detecting instruction means and removing data existing out of the field of view of a viewer to the computer system.

28. The storage medium according to claim 23, further comprising a visual-line/gaze range detecting instruction means for giving instructions for detecting viewer's visual line and gaze range with respect to an image actually displayed to the computer system, wherein the model moving instruction means gives instructions for moving the model in a direction perpendicular to the display according to a gaze range detected by an instruction of the visual-line/gaze range detecting instruction means.

29. The storage medium according to claim 23, further comprising a tone changing instruction means for giving instructions to the computer system for changing a tone of a displayed model so that the further away from the viewpoint, the closer the tone becomes a background tone.

30. The storage medium according to claim 23, wherein the model moving instruction means includes a means for, when a change occurs in the placement condition of the model seen from the viewpoint and the model move means moves the model according to the change, giving instructions for preventing an amount of moving of the model within the gaze range from exceeding about one degree in terms of angle of convergence for a predetermined period of time after the change in the placement condition occurs to the computer system.

31. The storage medium according to claim 23, wherein the image data creating instruction means has a means for giving instructions for determining stereoscopic condition of graphic user interface items to be displayed on the display screen to the computer system.

32. A stereoscopic display system for displaying a model stereoscopically using a pair of images seen from two different viewpoints, comprising:

a gaze range determining section configured to determine a gaze range over which a viewer's right and left eyes are likely to be fixed on a model displayed from model data in a stereoscopic coordinate system;

a model move section configured to move the model in a direction of depth with respect to a display screen to bring the gaze range determined by the gaze range determining section in an easiness-of-stereoscopy region in which stereoscopy is easy by changing data of the model;

a model enlargement/reduction section configured to adjust the inputted image data of the model to enlarge and reduce a size of the model removed by the model move section according to a distance over which the model is moved to make an imaginary size of the model on the viewers retina remain unchanged before and after the movement of the model;

a determining section configured to determine whether the model subjected to enlargement or reduction by the model enlargement/reduction section is placed within the easiness-of-stereoscopy region;

an interocular distance setting section configured to correct an interocular distance when it is determined by the determining section that at least some of the model is outside the easiness-of-stereoscopy region, to allow the model to fit into the easiness-of-stereoscopy region; and an image data creating section configured to create image data to be displayed on the display according to data obtained by the model move section, the model enlargement/reduction section and the interocular distance setting section.

33. The system according to claim 32, wherein the gaze range determining section has a section configured to estimate a gaze range for both eyes by taking into consideration at least one of placement condition, tone, brightness, saturation, size, complexity and moving speed of the model seen from a viewpoint of a viewer.

34. The system according to claim 32, wherein the model move section includes a depth distance reducing section configured to set a scale in the direction of depth seen from the viewer so that at least the major part of a model moved by the model move section comes in the region in which the stereoscopy is easy.

35. The system according to claim 32, further comprising an out-of-field data removing section configured to remove data of a model existing out of field of a viewer.

36. The stereoscopic display system according to claim 35, further comprising a visual-line/gaze range detecting section configured to detect viewer's visual line and gaze range with respect to an image actually displayed, wherein the out-of-field removing section calculates a field of a viewer on the basis of a visual line detected by the visual-line/gaze range detecting section and removes data existing out of the field of the viewer.

37. The system according to claim 32, further comprising a visual-line/gaze range detecting section configured to detect viewer's visual line and gaze range with respect to an image actually displayed, wherein the model move section moves the model in the direction of depth with respect to the display according to a gaze range detected by the visual-line/gaze range detecting section.

38. The system according to claim 32, further comprising a tone changing section configured to change a tone of a displayed model so that the further away from the viewpoint, the closer the tone becomes a background tone.

39. The system according to claim 32, wherein the model move section includes a section configured to, when a change occurs in the placement condition of the model seen from the viewpoint and the model move section moves the model according to the change, prevent an amount of moving of the model within the gaze range from exceeding about one degree in terms of angle of convergence for a predetermined period of time after the change in the placement condition occurs.

40. The system according to claim 32, wherein the image data creating section has a function of determining a stereoscopic condition of graphic user interface items to be displayed on the display screen.

* * * * *